(12) United States Patent
Budagavi et al.

(10) Patent No.: US 10,964,067 B2
(45) Date of Patent: Mar. 30, 2021

(54) VISUAL QUALITY ENHANCEMENT OF RECONSTRUCTED POINT CLOUDS VIA COLOR SMOOTHING

(71) Applicant: Samsung Electronics Co., Ltd., Suwon-si (KR)

(72) Inventors: Madhukar Budagavi, Plano, TX (US); Hossein Najaf-Zadeh, Allen, TX (US); Tuan Ho, Richardson, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 120 days.

(21) Appl. No.: 16/242,255

(22) Filed: Jan. 8, 2019

(65) Prior Publication Data

US 2019/0318509 A1 Oct. 17, 2019

Related U.S. Application Data

(60) Provisional application No. 62/696,255, filed on Jul. 10, 2018, provisional application No. 62/684,893, (Continued)

(51) Int. Cl.
*G06T 9/00* (2006.01)
*G06T 5/00* (2006.01)
(Continued)

(52) U.S. Cl.
CPC ............ *G06T 9/001* (2013.01); *G06K 9/6202* (2013.01); *G06K 9/6218* (2013.01); *G06T 5/002* (2013.01);
(Continued)

(58) Field of Classification Search
CPC ............ G06T 9/001; G06T 7/90; G06T 5/002; G06K 9/6202; G06K 9/6218
(Continued)

(56) References Cited

U.S. PATENT DOCUMENTS

2016/0086353 A1 3/2016 Lukac et al.
2017/0347100 A1 11/2017 Chou et al.
(Continued)

OTHER PUBLICATIONS

Mammou, K., et al.; "Second Working draft for Video-based Point Cloud Coding", International Organization for Standardization/ Organisation Internationale de Normalisation, 3DG subgroup, ISO/ IEC JTC1/SC29/WG11, MPEG 2018/N17771, Jul. 2018, 45 pages.
(Continued)

*Primary Examiner* — Michael R Neff

(57) ABSTRACT

A decoding device, an encoding device and a method for point cloud decoding is disclosed. The method includes receiving a compressed bitstream. The method also includes decoding the compressed bitstream into 2D frames that represent a 3D point cloud, each of the 2D frames including a set of patches representing a cluster of pixels of the 3D point cloud. The method further includes identifying an occupancy map included in the compressed bitstream. The method additionally includes identifying valid boundary points located at a boundary of a patch of the set of patches based on the occupancy map and identifying valid neighboring points of each of the valid boundary points of the patch. The method also includes generating the 3D point cloud using the 2D frames based on the valid neighboring points and the valid boundary points.

20 Claims, 13 Drawing Sheets

Related U.S. Application Data filed on Jun. 14, 2018, provisional application No. 62/656,846, filed on Apr. 12, 2018.

(51) Int. Cl.
    *G06K 9/62*     (2006.01)
    *G06T 7/90*     (2017.01)

(52) U.S. Cl.
    CPC ...... *G06T 7/90* (2017.01); *G06T 2207/10028* (2013.01)

(58) Field of Classification Search
    USPC .......................................................... 382/232
    See application file for complete search history.

(56) References Cited

U.S. PATENT DOCUMENTS

| | | |
|---|---|---|
| 2017/0347120 A1 | 11/2017 | Chou et al. |
| 2018/0053324 A1 | 2/2018 | Cohen et al. |
| 2019/0156520 A1* | 5/2019 | Mammou ............... G06T 9/001 |

OTHER PUBLICATIONS

ISA/KR, International Search Report and Written Opinion of the International Searching Authority in connection with International Application No. PCT/kr2019/004367, dated Jul. 23, 2019, 9 pages.
Preda, Marius, "Point Cloud Compression in MPEG," MP20 workshop on standards, plans, and explorations of immersive media, Oct. 28, 2017, 24 pages.

\* cited by examiner

VISUAL QUALITY ENHANCEMENT OF RECONSTRUCTED POINT CLOUDS VIA COLOR SMOOTHING

CROSS-REFERENCE TO RELATED APPLICATION AND CLAIM OF PRIORITY

This application claims priority under 35 U.S.C. § 119(e) to (i) U.S. Provisional Patent Application No. 62/656,846 filed on Apr. 12, 2018, (ii) U.S. Provisional Patent Application No. 62/684,893 filed on Jun. 14, 2018, and (iii) U.S. Provisional Patent Application No. 62/696,255 filed on Jul. 10, 2018. The above-identified provisional patent applications are hereby incorporated by reference in its entirety.

TECHNICAL FIELD

This disclosure relates generally to multimedia data. More specifically, this disclosure relates to apparatus and a method for compressing and decompressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors track head movement in real-time to determine the region of the 360° video that the user wants to view. 360° video provides a three Degrees of Freedom (3DoF) immersive experience. Six Degrees of Freedom (6DoF) is the next level of immersive experience where in the user can turn his head as well as move around in a virtual/augmented environment. Multimedia data that is three-dimensional (3D) in nature, such as point clouds, is needed to provide 6DoF experience.

Point clouds and meshes are a set of 3D points that represent an objects surface. Point clouds are common in a variety of applications such as gaming, 3D maps, visualizations, medical applications, augmented reality, virtual reality, autonomous driving, multi-view replay, 6DoF immersive media, to name a few. Point clouds, if uncompressed, generally require a large amount of bandwidth for transmission. Due to the large bitrate requirement, point clouds are often compressed prior to transmission.

SUMMARY

This disclosure provides visual quality enhancement of reconstructed point clouds via color smoothing.

In a first embodiment, a decoding device for point cloud decoding is provided. The decoding device includes a communication interface and a processor that is operably coupled to the communication interface. The communication interface is configured to receive a compressed bitstream. The processor is configured to decode the compressed bitstream into 2D frames that represent a 3D point cloud, each of the 2D frames including a set of patches representing a cluster of pixels of the 3D point cloud. The processor is also configured to identify an occupancy map included in the compressed bitstream, the occupancy map indicating locations of points in the 2D frames that represent valid pixels of the 3D point cloud. The processor is further configured to identify valid boundary points located at a boundary of a patch of the set of patches based on the occupancy map. The processor is additionally, configured to identify valid neighboring points of each of the valid boundary points of the patch. The processor is also configured to generate the 3D point cloud using the 2D frames based on the valid neighboring points and the valid boundary points.

In another embodiment an encoding device for point cloud encoding is provided. The encoding device includes a processor and a communication interface operably coupled to the processor. The processor is configured to generate for a 3D point cloud, 2D frames, each of the 2D frames including a set of patches representing a cluster of pixels of the 3D point cloud. The processor is also configured to generate a flag that signals when color smoothing is performed. The processor is additionally configured to generate metadata indicating parameters associated with the color smoothing. The processor is further configured to generate an occupancy map indicating locations of points in the 2D frames that represent valid pixels of the 3D point cloud. The processor is also configured to encode the 2D frames, the flag, the metadata, and the occupancy map to generate a compressed bitstream. The communication interface is configured to transmit the compressed bitstream In yet another embodiment a method for decoding is provided. The method includes receiving a compressed bitstream. The method also includes decoding the compressed bitstream into 2D frames that represent a 3D point cloud, each of the 2D frames including a set of patches representing a cluster of pixels of the 3D point cloud. The method additionally includes identifying an occupancy map included in the compressed bitstream, the occupancy map indicating locations of points in the 2D frames that represent valid pixels of the 3D point cloud. The method further includes identifying valid boundary points located at a boundary of a patch of the set of patches based on the occupancy map. The method also includes identifying valid neighboring points of each of the valid boundary points of the patch. The method additionally includes generating the 3D point cloud using the 2D frames based on the valid neighboring points and the valid boundary points.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
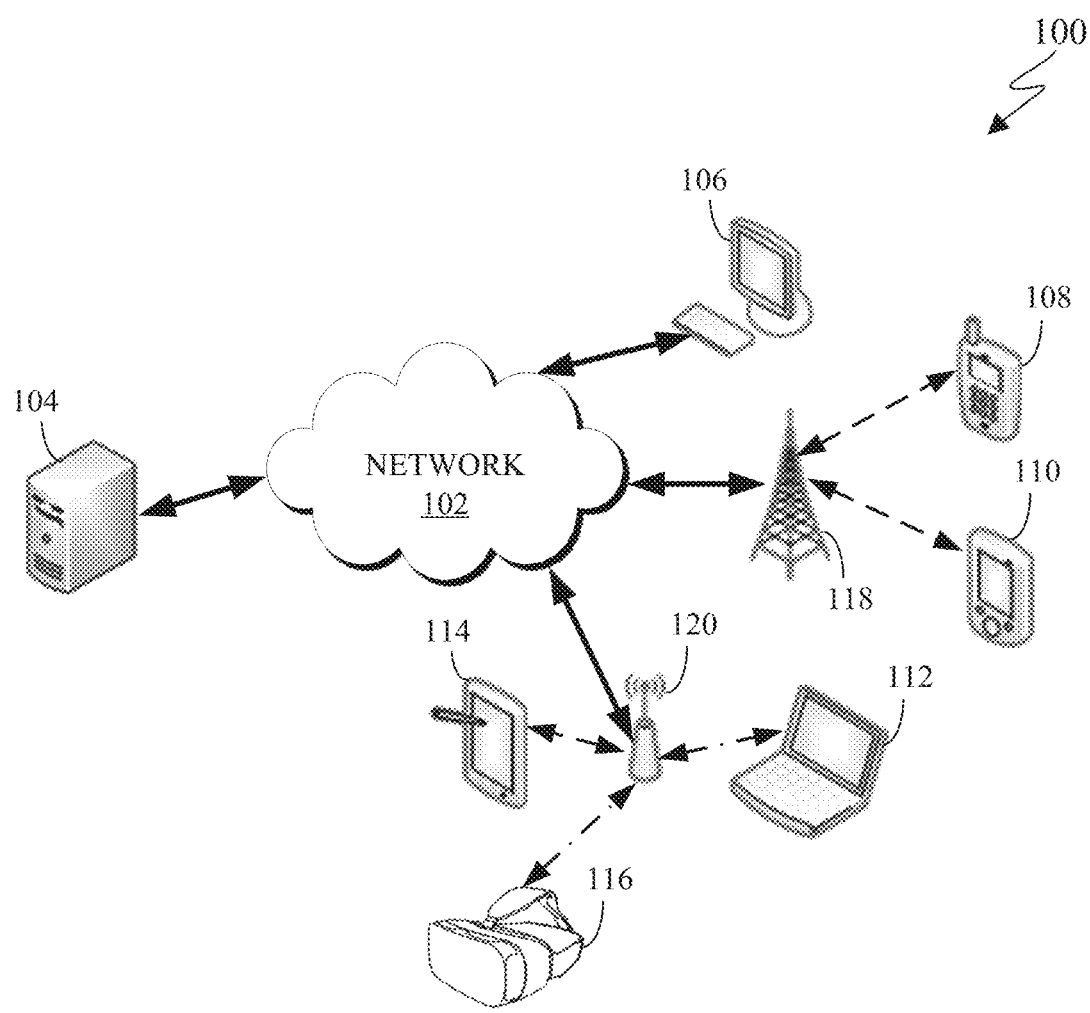
FIG. 1 illustrates an example communication system in accordance with an embodiment of this disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Augmented reality (AR) is an interactive experience of a real world environment where objects that reside in the real-world environment are augmented with objects, information, or both. Virtual reality (VR) is a rendered version of a visual scene. In certain embodiments, AR and VR include both visual and audio stimuli. The rendering is designed to mimic the visual stimuli, and if available audio sensory stimuli, of the real world as naturally as possible to an observer or user as the individual moves within the limits defined by the application or the AR or VR scene. For example, VR places a user into immersive worlds that interact with their head movements. At the video level, VR is achieved by providing a video experience that covers as much of the field of view (FOV) as possible together with the synchronization of the viewing angle of the rendered video with the head movements. Although many different types of devices are able to provide such an experience, head-mounted displays (HMD) are popular devices that enable a user to view the VR scene and adjust the displayed content based on movements of the head of the user. Typically, HMDs rely either on dedicated a screens integrated into the device and running with external computers (tethered) or on a device, such as a smartphone, that is inserted into the HMD (untethered). The first approach utilizes lightweight screens and benefiting from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a 3D representation of an object in a VR or AR environment. Similarly, a point mesh is a 3D representation of an object in a VR environment. A point cloud or a point mesh can include an entire scene as well as individual objects.

Generally, a point cloud is a collection of data points defined by a coordinate system. For example, in a 3D Cartesian Coordinate System, each point of a point cloud is identified by three coordinates, that of X, Y, and Z. When each point is identified by the three coordinates, a precise location in 3D environment or space is identified, relative to an origin point. The origin point is a location where the X, Y, and Z axes intersect. The points of a point cloud often represent the external surface of the object. Each point of a point cloud is defined by attributes such as a geometric position of each point within the three coordinates and texture of each point. Texture can include color, intensity, normal, reflectance, and the like.

In certain embodiments, a 3D mesh (or a 3D point cloud) can be rendered on spherical coordinate system. In certain embodiments, each point can be located in the X, Y, Z coordinates that are within a sphere. Similarly, texture coordinates U and V indicate a location of texture of the image. When the object is rendered, the vertices of the mesh, the corresponding texture coordinate, and the texture image are inputted into a graphical processing unit which maps the mesh onto the 3D geometry. The user can have a FOV that is positioned at the center of the virtual sphere and sees a portion of the 360° scene corresponding to the viewport. In certain embodiments, alternative shapes can be used instead of a sphere such as a cube, an icosahedron, an octahedron, and the like. Point clouds and meshes are illustrated and discussed in greater detail below with reference to FIG. 4A.

Point clouds and meshes are commonly used in a variety of applications, including gaming, 3D mapping, visualization, medicine, AR, VR, autonomous driving, multi-view replay, 6 degrees of freedom immersive media, to name a few. As used hereinafter, the term 'point cloud' also refers to a '3D point cloud,' and a '3D mesh'.

Transmitting a point cloud, from one electronic device to another often requires significant bandwidth due to the size and complexity of the data associated with a single point cloud. The transmission of a point cloud often requires specific compression techniques to reduce the size of the data prior to transmission. For example, compressing a point cloud can require dedicated hardware or specific compression algorithms or a combination thereof. Generally, compression algorithms for a point cloud are different from compression algorithms of other multimedia forms, such as 2D images, 2D video, and the like. Embodiments of the present disclosure take into consideration that due to the size constraints, compressing a point clouds is necessary in order to expedite and improve transmission of the point cloud from a source device to another device (such as a user equipment). That is, an uncompressed point cloud uses significant bandwidth for transmission and causes the rendering of the point cloud to be delayed. Certain dedicated hardware components can be used to meet the real-time demands or reduce delays or lags in the rendering of the point cloud; however such hardware components are often expensive. According to embodiments of the present disclosure, using existing video codecs for compressing a 3D point cloud is possible by manipulating a 3D point cloud such that the 3D point cloud is projected onto multiple 2D frames. For example, a video codec such as HEVC, AVC, VP9, VP8, JVNET, and the like can be used to compress a point cloud, when the point cloud is manipulated to fit on multiple 2D frames. For example, the 3D point cloud is represented as multiple patches where each patch includes a cluster of points from the 3D point cloud. The patches are then packed into 2D frames and encoded to generate a bitstream. When the point cloud is deconstructed to fit on multiple 2D frames, the frames can be transmitted using less bandwidth than transmitting the original point cloud. After the bitstream is generated, it is transmitted to a display device, and the content within the 2D frame can be reconstructed into the 3D object and rendered on a display, such that the 3D object can be viewed by a user.

According to embodiments of the present disclosure, architecture for carrying out a point cloud compression using a video codec is provided. Embodiments of the present disclosure provide architecture for point cloud compression using a video codec. An encoder can deconstruct a point cloud, such that the point cloud is projected onto multiple 2D frames. The frames can include patches representing the geometric position of each point of the point cloud, as well as various attributes or textures of the points of the point cloud. FIGS. 4B-4D, which are described in greater detail below, illustrate a 3D point cloud that is projected onto 2D frames by creating patches of the point cloud.

For example, an encoder can manipulate a 3D point cloud and transmit a bitstream representing the point cloud to a decoder. The decoder reconstructs the 3D point cloud to be viewed by a user. The encoder projects the 3D object onto multiple 2D frames, compresses the frames, and generates and transmits a bitstream including the compressed frames. The decoder, receives the bitstream, decompresses the frames, reconstructs, and renders the 3D object so a user can view the displayed object.

Embodiments of the present disclosure recognize and take into consideration that two or more patches can be projected next to each other on the same 2D frame. It is possible that when the decoder generates the 3D point cloud, that pixels from one patch can cross over into another patch, thereby creating visible artifacts at patch boundaries of the reconstructed point cloud. Embodiments of the present disclosure provide systems and methods for reducing visible artifacts at patch boundaries of the reconstructed point cloud. Prior to rendering the reconstructed point cloud on a display device, such as a HMD, the color of points that are near the patch boundary are smoothed. Points that are near patch boundaries can be identified and then the color components (such as the red color value, the blue color value and the green color value) of the identified points are smoothed to reduce or eliminate visible artifacts when rendering and displaying the reconstructed point cloud.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. As described in more detail below, the HMD 116 can display 360° scenes including one or more point clouds. In certain embodiments, any of the client devices 106-116 can include a decoder.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and server 104

In certain embodiments, any of the client devices 106-116 or the server 104 can compress, transmit, receive, render a point cloud, or a combination thereof. For example, the server 104 can then compress and transmit the point cloud data to particular client devices 106-116. For another example, one of the client devices 106-116 can compress and transmit point cloud data to another client device 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
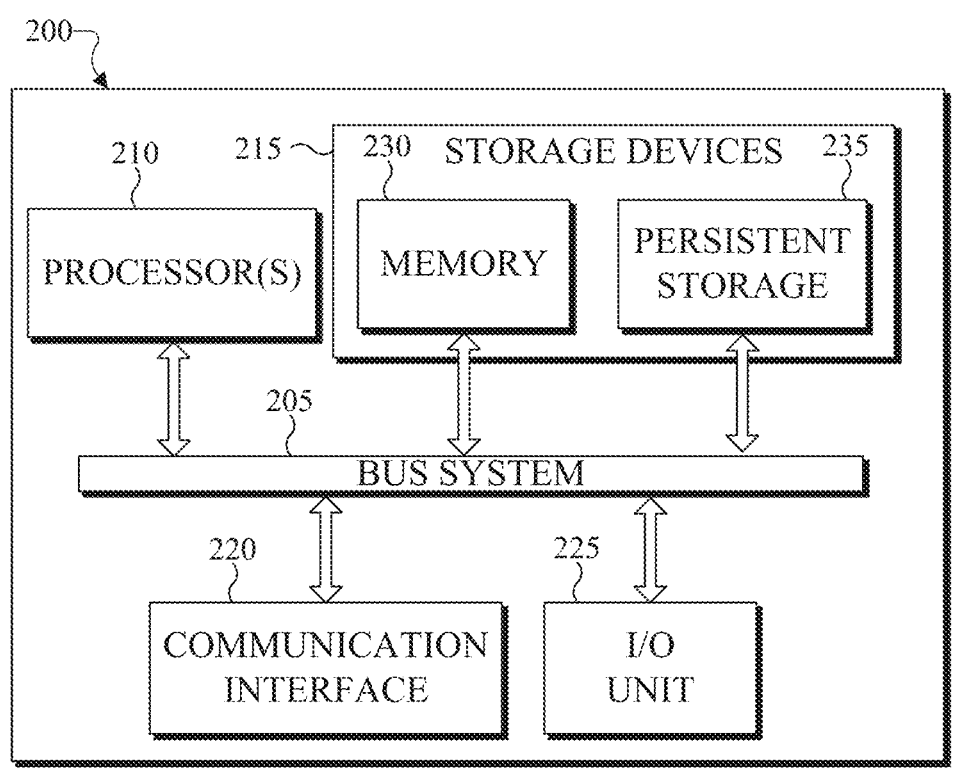
FIGS. 2 and 3 illustrate example electronic devices in accordance with an embodiment of this disclosure.
Figure 3:
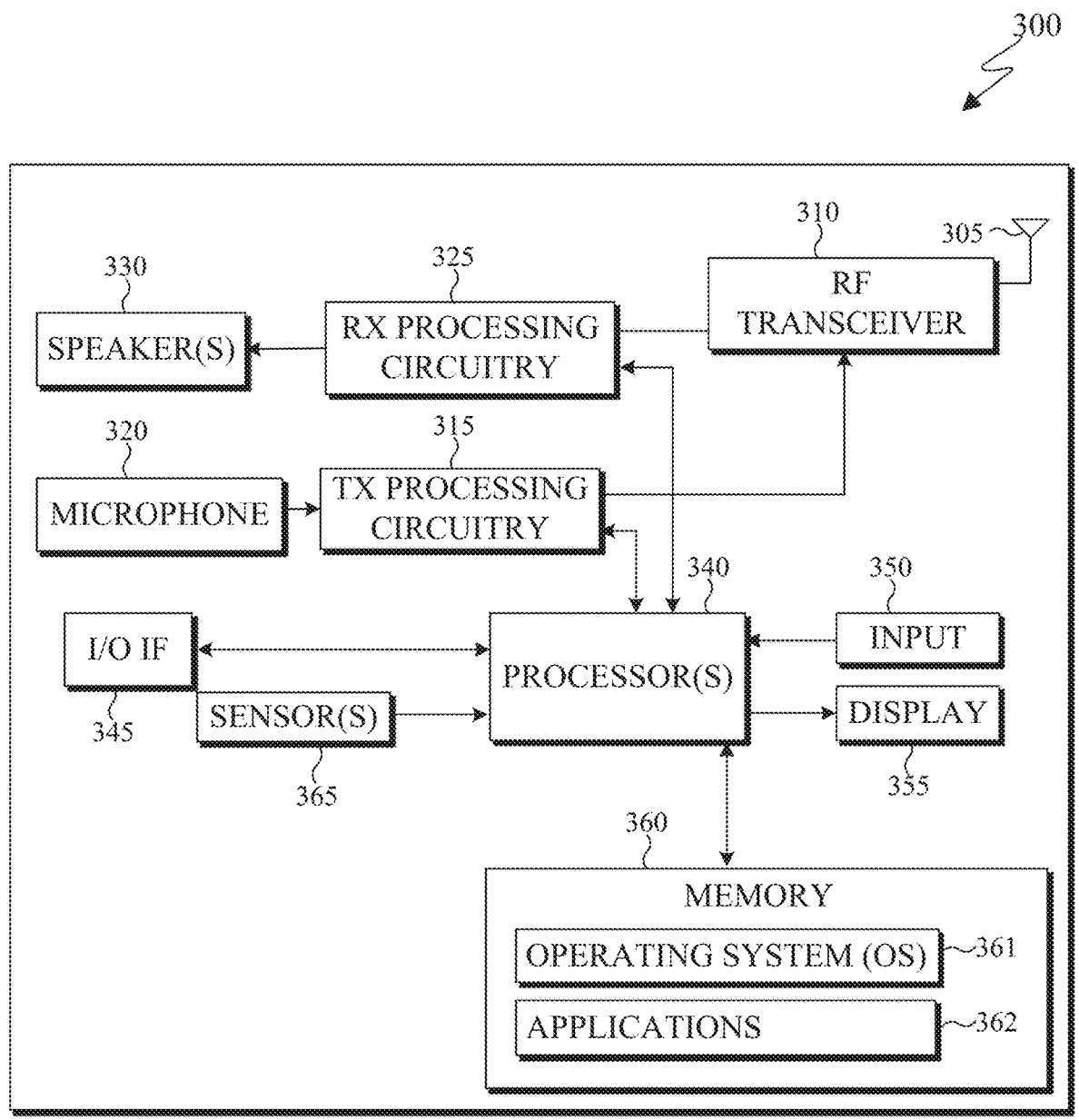

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more local servers, one or more remote servers, clustered computers, and components that act as a single pool of seamless resources, a cloud-based server, and the like. The server 200 can be accessed by one or more of the client devices 106-116 of FIG. 1.

The server 200 can represent one or more local servers, one or more compression servers, or one or more encoding servers, such as an encoder. As shown in FIG. 2, the server 200 includes a bus system 205 that supports communication between at least one processing device 210, at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a radio frequency (RF) transceiver, a BLUETOOTH transceiver, a WI-FI transceiver, a ZIGBEE transceiver, an infrared transceiver, and the like. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive, store, and timely instruct by providing ASR processing and the like. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include a VR or AR application, camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from web sites, videos, games, images, and the like. The display 355 can be sized to fit within a HMD. The display 355 can be a singular display screen or multiple display screens capable of creating a stereoscopic display. In certain embodiments, the display 355 is a heads-up display (HUD).

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, etc. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can receive an encoded bitstream from another electronic device or via the network 102 of FIG. 1. The electronic device 300 decodes the received bitstream into multiple 2D frames. In certain embodiments, the decoded bitstream also includes an occupancy map. The decoded bitstream can also include one or more flags indicating whether smoothing is performed while reconstructing the point cloud. The decoded bitstream can also include parameters that describe how to perform the smoothing. The multiple 2D frames can include a set of frames that indicate coordinates, such as a geographic location of each point of a point cloud. For example, the frames can include a pictorial depiction, such as one or more patches of each geometric point of the point cloud as represented in 2D. Another set of frames can include texture that is associated with each point, such as the color of each point. The electronic device 300 can then reconstruct and render the point cloud in three dimensions.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4A:
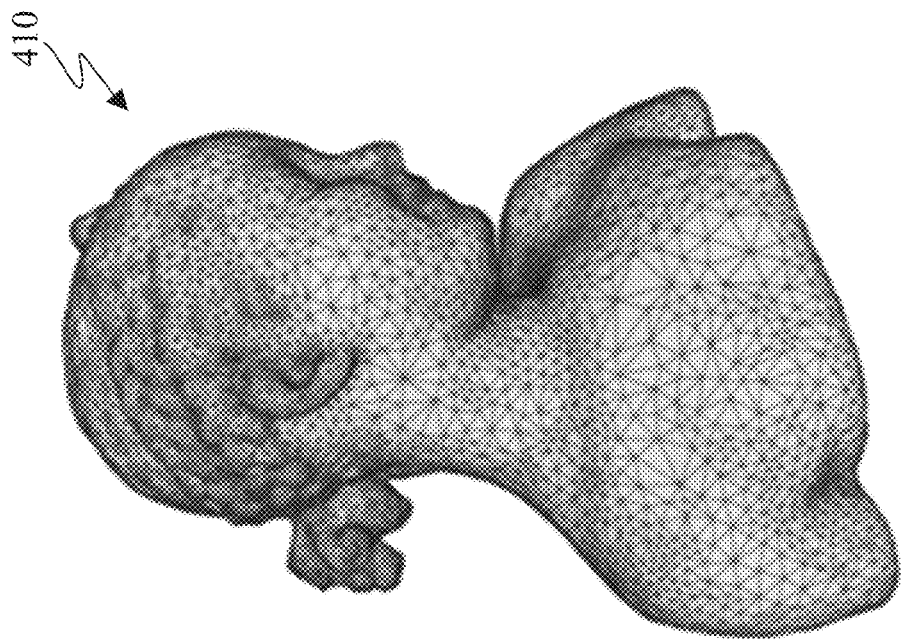
FIG. 4A illustrates an example point cloud and an example mesh in accordance with an embodiment of this disclosure.
Figure 4A:
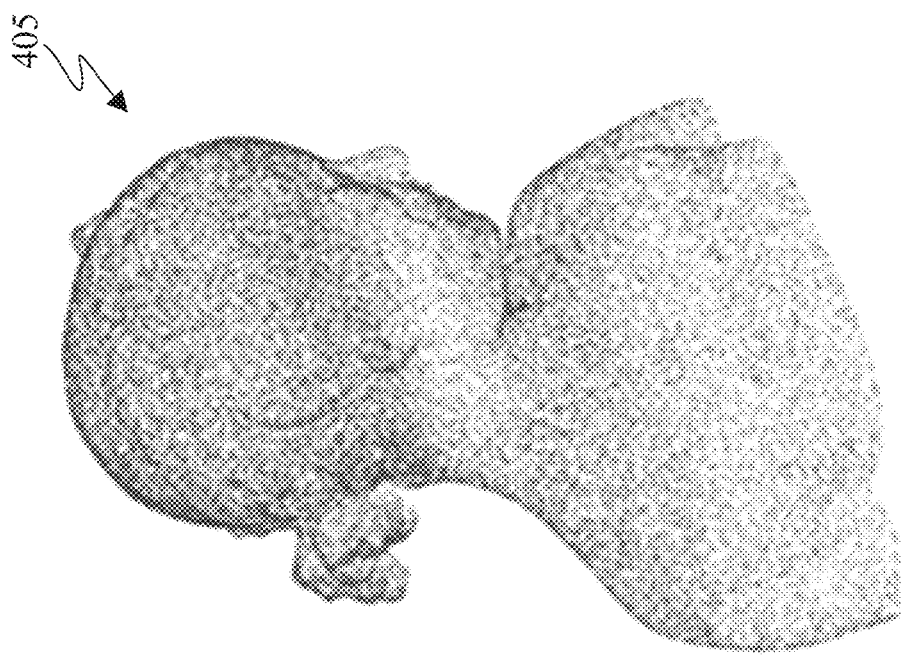
Figure 4D:
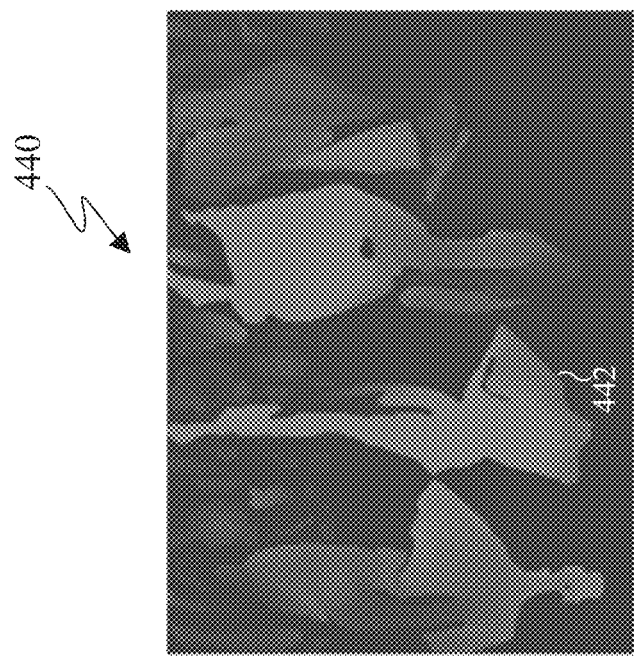
FIGS. 4B, 4C, and 4D illustrate an example 3D point cloud and 2D frames, that represent the 3D point cloud in accordance with an embodiment of this disclosure.
Figure 4C:
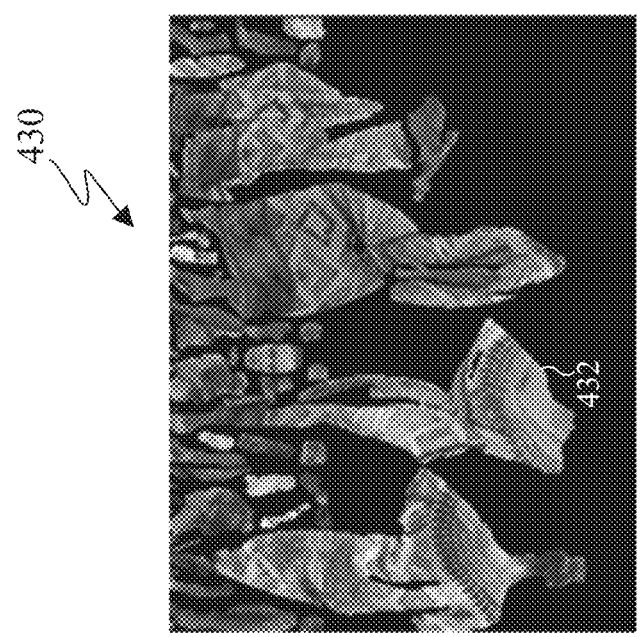
Figure 4B:

FIG. 4A illustrates an example point cloud 405 and an example mesh 410 in accordance with an embodiment of this disclosure. The point cloud 405 depicts an illustration of a point cloud. The point cloud 405 includes multiple points that visually define an object in 3D space. Each point of the point cloud represents an external coordinate of the object, similar to a topographical map. For example, each point can include one or more attributes. The attributes can include geometry, such as a geographical location of each point of the point cloud. The attributes of each point can also include color, intensity, texture, motion, material properties, reflectiveness, and the like.

Similarly, the mesh 410 depicts an illustration of a 3D mesh. The mesh 410 illustrates the external structure of an object that is built out of polygons. For example, the mesh 410 is a collection of vertices, edges, and faces that define the shape of an object. The mesh 410 is defined by many polygonal or triangular interconnectivity of information between the various points. Each polygon of the mesh 410 represents the external surface of the object. The vertices of each polygon are similar to the points in the point cloud 405. Each polygon can include information, such as an attribute. The attribute can include geometry and texture. Texture includes color, reflectiveness, motion, and the like. For example, topological data provide connectivity information among vertices such as adjacency of vertices, edges, and faces. Geometrical information provides the geometric location of each vertex in 3D space.

FIGS. 4B, 4C, and 4D illustrate an example 3D point cloud and 2D frames that represent the 3D point cloud in accordance with an embodiment of this disclosure. In particular, FIG. 4B illustrates a 3D point cloud 420, and FIGS. 4C and 4D each illustrate a 2D frame that includes patches. The FIG. 4C illustrates the frame 430 that includes the color associated with each patch of the 3D point cloud 420. The FIG. 4D illustrates the frame 440 that indicates the geometric position of each point of the 3D point cloud 420. The embodiment of FIGS. 4B, 4C, and 4D, are for illustration only and other embodiments could be used without departing from the scope of this disclosure.

The 3D point cloud 420 is similar to the point cloud 405 and the mesh 410 of FIG. 4A. The 3D point cloud 420 is a set of data points in 3D space. Each point of the 3D point cloud includes multiple attributes such as (i) geometric position that provides the structure of the 3D point cloud and (ii) one or more textures that provide information about each point such as color, reflectiveness, material, and the like.

FIGS. 4C and 4D illustrate the 2D frames 430 and 440 respectively. The 2D frame 430, depicts multiple patches (such as a patch 432) representing the color of the 3D point cloud 420. The frame 440, depicts multiple patches (such as a patch 442) representing the depth values of the 3D point cloud 420. The location of the patches within the 2D frames 430 and 440 can be similar for a single position of the 3D point cloud. For example, as the 3D point cloud changes, new frames can be generated with different patches based on the new position the 3D point cloud.

Although FIGS. 4A, 4B, 4C, and 4D illustrate example point clouds, point meshes and 2D frames representing a point cloud various changes can be made to FIGS. 4A, 4B, 4C, and 4D. For example, the point cloud and point mesh represent a single object, whereas in other embodiments, a point cloud or point mesh can represent multiple objects, scenery (such as a landscape), AR, and the like. In another example, the patches included in the 2D frames can represent other attributes such as texture, luminance, material, and the like. FIGS. 4A, 4B, 4C, and 4D do not limit this disclosure to any particular 3D object(s) and 2D frames representing the 3D object(s).

Figure 5A:
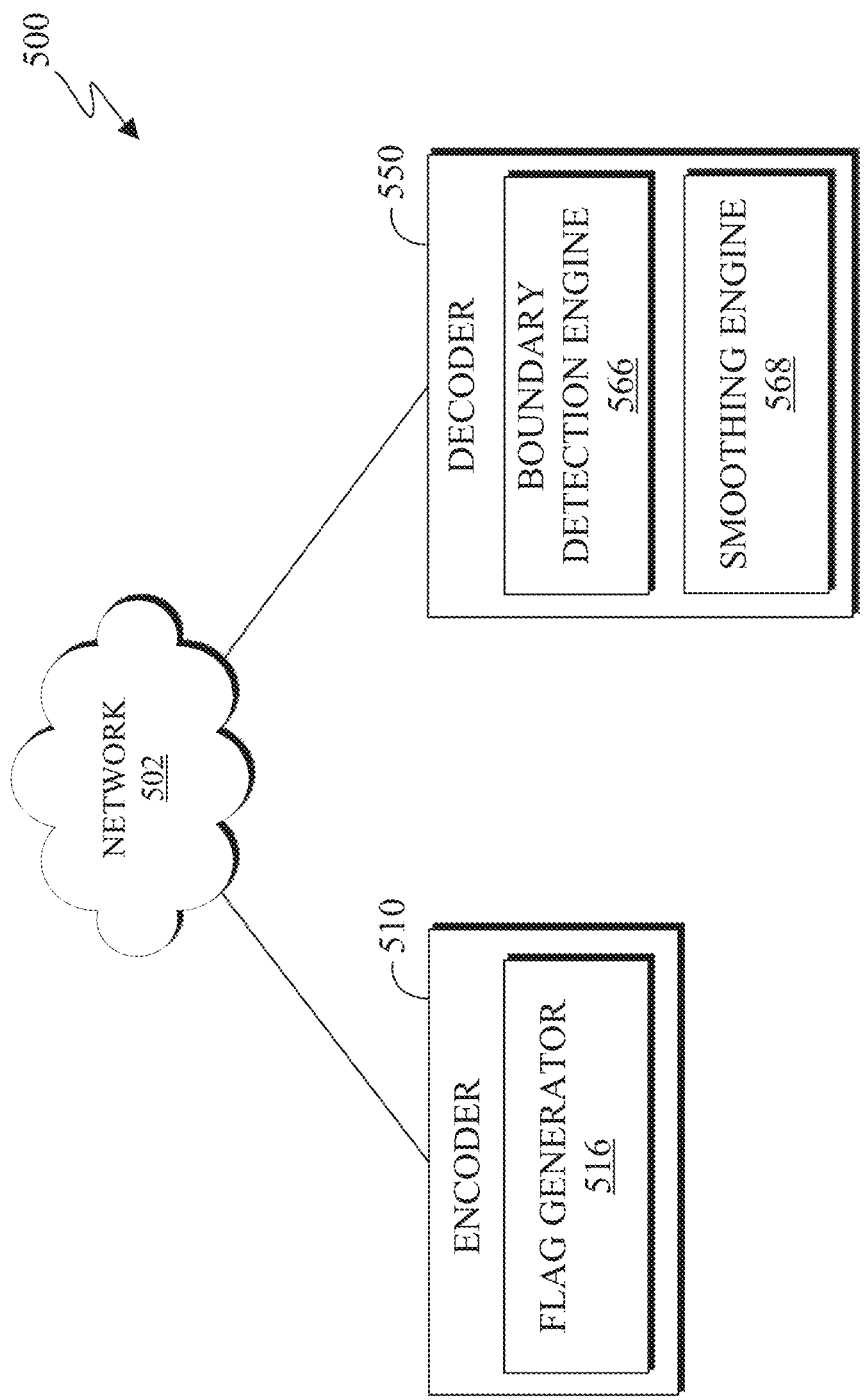
FIG. 5A illustrates a block diagram of an example environment-architecture in accordance with an embodiment of this disclosure.
Figure 5B:
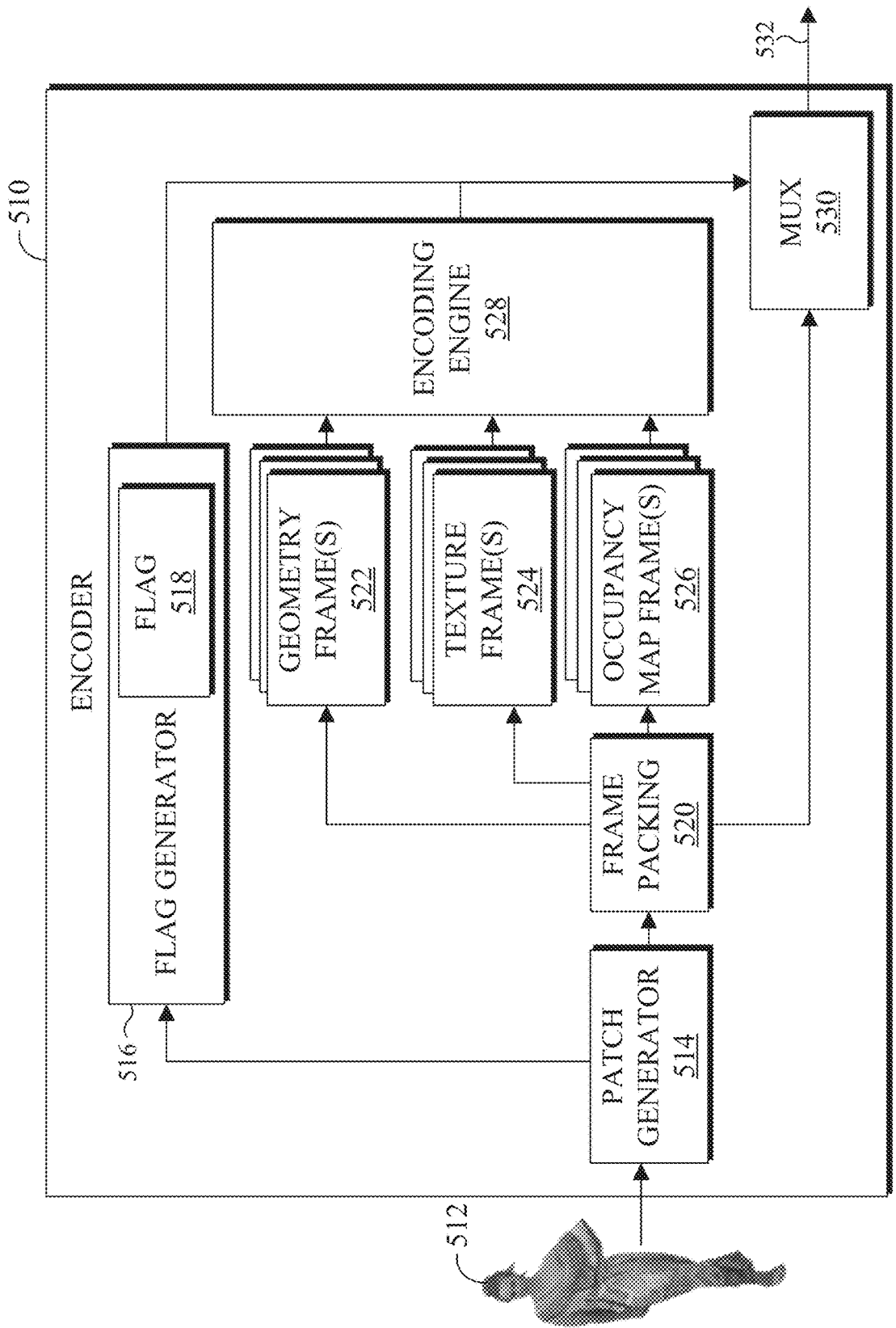
FIG. 5B illustrates an example block diagram of an encoder in accordance with an embodiment of this disclosure.
Figure 5C:
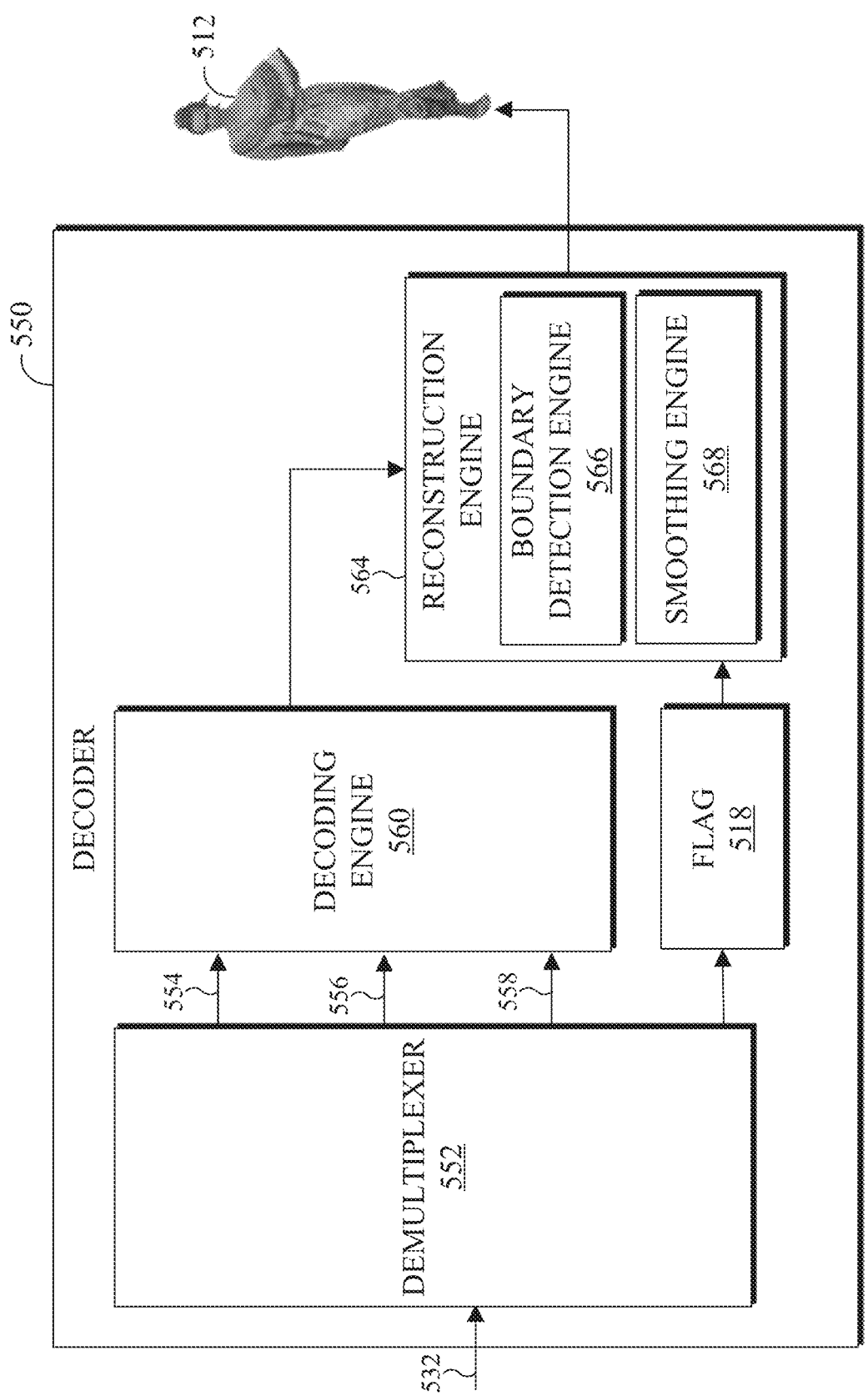
FIG. 5C illustrates an example block diagram of a decoder in accordance with an embodiment of this disclosure.

FIG. 5A illustrates a block diagram of an example environment-architecture 500 in accordance with an embodiment of this disclosure. As shown in FIG. 5A, the environment-architecture 500 includes an encoder 510 and a decoder 550 in communication over a network 502. FIG. 5B illustrates an example block diagram of the encoder 510 of FIG. 5A in accordance with an embodiment of this disclosure. FIG. 5C illustrates an example block diagram of the decoder 550 of FIG. 5A in accordance with an embodiment of this disclosure. The embodiments of FIGS. 5A, 5B, and 5C are for illustration only. Other embodiments can be used without departing from the scope of this disclosure.

The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200, and the encoder 510), one or more electronic devices (such as the client devices 106-116 of FIG. 1, the electronic device 300, the encoder 510, and the decoder 550). Further, in certain embodiments, the network 502 can be connected to an information repository that contains a VR and AR media content that can be rendered and displayed on an electronic device associated with the decoder 550.

In certain embodiments, the encoder 510 and the decoder 550 can represent the server 104, one of the client devices 106-116 of FIG. 1, the server 200 of FIG. 2, the electronic device 300 of FIG. 3, or other suitable device. In other embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to one electronic device and the decoder 550 is operably connected to another electronic device. In certain embodiments, the encoder 510 and the decoder 550 are the same device or operably connected to the same device.

In this example, the encoder 510 can be included in a server, such the servers 104 or 200. The encoder 510 is described with more below in FIG. 5B. In certain embodiments, encoder 510 is a web server, a server computer such as a management server, or any other electronic computing system capable of, mapping the three dimensions of a point cloud into two dimensions, packing the patches representing the 3D point cloud onto 2D frames, compressing frames, and encoding images for transmission. In certain embodiments, the encoder 510 can be a "cloud" of computers interconnected by one or more networks, where each is a computing system utilizing clustered computers and components to act as a single pool of seamless resources when accessed through the network 502. The encoder 510 includes a flag generator 516.

The encoder 510 can receive 3D media content, such as a point cloud, from another device such as a server (similar to the server 104 of FIG. 1, the server 200 of FIG. 2) or an information repository (such as a database). In certain embodiments, the encoder 510 can receive media content from multiple cameras and stitch the content together to generate a 3D scene. The encoder 510 compresses, encodes, and transmits a point cloud (or a mesh) as an encoded bitstream.

The encoder 510 can project a 3D point cloud (such as the 3D point cloud 420 of FIG. 4B) into multiple patches (such as the patches 432 and 442 of FIGS. 4C and 4D, respectively) and pack the patches onto frames (such as the frames 430 and 440 of FIGS. 4C and 4D, respectively). The encoder 510 also generates a bitstream that represents the 3D media content based on the 2D frames. The bitstream can be transmitted to an information repository (such as a database) or a decoder (such as the decoder 550) through the network 502.

In certain embodiments, the encoder 510 generates multiple 2D frames in which a point cloud or a mesh is mapped or projected onto. In other embodiments, the encoder 510 projects the 3D point cloud onto 2D frames. In yet other embodiments, the point cloud is unwrapped and mapped onto multiple 2D frames. For example, the point cloud can be unwrapped along one axis (such as the Y-axis), and the image is mapped along the remaining axis (such as X and Z axis). In another example, a cluster of points of the 3D point cloud can be projected onto a 2D frame. For instance, the geometric coordinate Z of a point of the 3D point cloud is projected at an X and Y coordinates of the 2D frame, where the X and Y coordinate of the 2D frame correspond to the X and Y coordinate of the point of the 3D point cloud.

The encoder 510 clusters pixels of a point cloud (such as the 3D point cloud 420 of FIG. 4B) into groups which are projected onto XY, YZ, and XZ plans. The projected clusters are the patches similar to the patches 432 of FIG. 4C. The projected clusters are packed into 2D frames (similar to frames 430 and 440 of FIGS. 4C and 4D, respectively) for encoding. Since various patches can be packed next to each other in a 2D frame, pixel values from neighboring patches on the 2D frame (but not neighboring pixels of the 3D point cloud) can be mixed up by the video codec thereby creating the visible artifacts at patch boundaries when the 3D point cloud is reconstructed by the decoder, such as the decoder 550.

The flag generator 516 generates a flag that instructs the decoder 550 to perform smoothing on the point cloud, when reconstructing the point cloud. For example, if the flag generator 516 generates a flag for color smoothing, the encoder 510 embeds the flag in the bitstream to enable color smoothing at the decoder 550. Syntax (1), below illustrates the encoder embedding a color smoothing flag into the bitstream to enable color smoothing at the decoder as well as various parameters that instruct the decoder 550 how to perform the color smoothing.

```
Syntax                                                                    (1)
int PCCEncoder::compressHeader(...){
...
bitstream.write<uint8_t>(uint8_t(params_.flagColorSmoothing_));
  if (params_.flagColorSmoothing_) {
      bitstream.write<uint8_t>(uint8_t(params_.thresholdColorSmoothing_));
      bitstream.write<double> (double(params_.thresholdLocalEntropy_));
      bitstream.write<uint8_t>(uint8_t(params_.radius2ColorSmoothing_));
      bitstream.write<uint8_t>(uint8_t(params_.neighborCountColorSmoothing_));
  }
...
}
```

Syntax (1) describes that if the flag value is one, color smoothing is enabled at the decoder, whereas if the flag value is zero, color smoothing is disabled. If the flag indicates color smoothing, the encoder 510 can also generate parameters, such as metadata, that instruct the decoder 550 how to perform the color smoothing. The parameters can also be embedded in the bitstream (as shown in Syntax (1) above). Example parameters include the "params_.thresholdLocalEntropy," the "params_.thresholdColorSmoothing," the "params_.radius2ColorSmoothing," and the "params_.neighborCountColorSmoothing." These parameters are used by the decoder 550 to indicate if color smoothing is to be performed (based on the presence of the flag), how to perform the color smoothing. If the flag generator 516 generates a flag that instructs the decoder 550 to perform smoothing on a received bitstream that represents a point cloud, the decoder 550 will (i) identify a neighborhood around a query point, (ii) calculate the local entropy in the neighborhood, (iii) compare the local entropy against a threshold, such as the threshold indicated by the in the "params_.thresholdLocalEntropy," (iv) calculate the centroid of the color of points in the neighborhood, and (v) replace the color of the query point with the calculated centroid, based on a second threshold that indicates whether smoothing is to occur, such as the threshold indicated by the "params_.thresholdColorSmoothing."

The "params_.thresholdLocalEntropy" is a parameter that includes a threshold of local entropy. The decoder 550 can calculate the local entropy associated with boundary points. If the calculated local entropy is smaller than the threshold as indicated in parameter "params_.thresholdLocalEntropy" then the decoder 550 calculates a centroid. The centroid represents the average color value for each color component for both the valid boundary points and the points that neighbor the boundary points. For example, the average of the red color values, the average of the green color values, and the average of the blue color values are computed for the valid boundary points and the points that neighbor the boundary points. The "params_.thresholdColorSmoothing" is a threshold parameter that indicates to the decoder 550 whether color smoothing is performed. For example, the smoothing engine 568 included in the decoder 550 is to replace the color of a query point with the color centroid if the difference between the color of the query point and the color centroid is larger than this color smoothing threshold. For example, the average color values (the averaged red, blue, and green color values) are used to replace the actual color values of the valid boundary points and the points that neighbor the boundary points. The "params_.radius2ColorSmoothing" indicates a distance that color smoothing is to be performed by the smoothing engine 568 of the decoder 550. Similarly, the parameter of "params_.neighborCountColorSmoothing" indicates the number of neighboring points that are identified as a boundary point to which color smoothing is performed by the smoothing engine 568 of the decoder 550.

Color smoothing is based on local entropy of the points in the neighborhood of a query point. If the local entropy is large, the point cloud is highly textures, and color smoothing will not be performed. Alternatively, if the local entropy is small, the point cloud is minimally textured, and color smoothing could be performed. That is, the higher the value of local entropy, the more textured the point cloud is. If the local entropy is larger than a threshold (such as the threshold indicated by the parameter "params_.thresholdLocalEntropy," indicating that the points are highly textured), no color smoothing is performed on the query point. In certain embodiments, the encoder 510 sets the threshold parameter and imbeds the parameter into the bitstream. In other embodiments, the threshold is predefined and the encoder 510 imbeds the parameter into the bitstream. The encoder 510 can also set a distance from a query point that color smoothing is applied, such as the "params_.neighborCountColorSmoothing." For example, the parameters can also include a number of neighboring pixels from a query point that the colors of the pixels are smoothed.

The decoder 550 can receive a bitstream that represents 3D media content, such as a point cloud, a mesh, or both. The bitstream can include multiple 2D frames representing a 3D point cloud. The decoder 550 can decode the bitstream and generate a 3D point cloud from multiple 2D frames included in the bitstream.

In this example, the decoder 550 can be included in any of the client devices 106-116, such as the HMD 116. The decoder 550 is described with more below in FIG. 5C. The decoder 550 includes a boundary detection engine 566 and a smoothing engine 568. If the decoder 550 identifies a flag that signals for color smoothing, then the boundary detection engine 566 identifies boundaries of the patches in a frame. In certain embodiments, after the boundary point is identified, the boundary detection engine 566 identifies neighboring points of the boundary point. After the boundary point is identified the smoothing engine 568 performs color smoothing of the identified boundary points and if indicated the neighboring boundary points.

Figure 6:
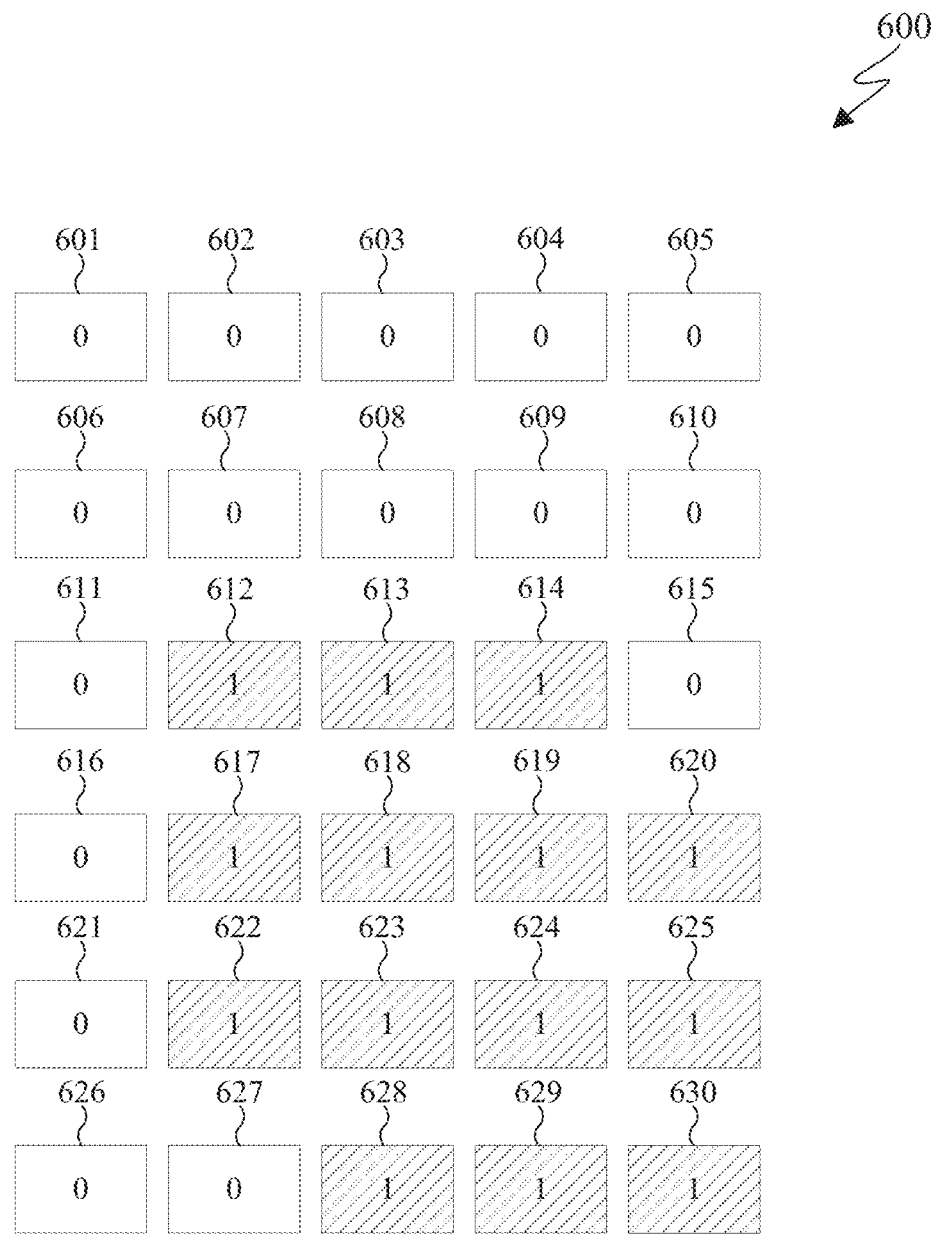
FIG. 6 illustrates an example portion of a 2D frame in accordance with an embodiment of this disclosure.

The boundary detection engine 566 identifies points near a patch boundary based on the occupancy map (such as the occupancy map frames 526 of FIG. 5B). Additionally, the boundary detection engine 566 can also identify points in proximity to the points at the patch boundary. The points in proximity to the points at the patch boundary are referred to as neighboring points. FIG. 6 below illustrates an example process of identifying boundary points and the neighboring points within a 2D frame. Syntax (2) describes identifying boundary points and Syntax (3) describes identifying neighboring points of boundary points.

Syntax: (2)
```
void PCCCodec::generatePointCloud( ... ) {
    ...
    // Identify boundary points
            if (occupancyMap[y * imageWidth + x] != 0) {
                if (y > 0 && y < imageHeight - 1) {
                    if (occupancyMap[(y - 1) * imageWidth + x] == 0 ||
                            occupancyMap[(y + 1) * imageWidth + x] == 0) {
                        PBflag[y * imageWidth + x] = 1;
                        reconstruct.setBoundaryPointType(pointindex_1,
    static_cast<uint16_t>(1));
                    }
                }
                if (x > 0 && x < imageWidth - 1) {
                    if (occupancyMap[y * imageWidth + (x + 1)] == 0 ||
                            occupancyMap[y * imageWidth + (x - 1)] == 0) {
                        PBflag[y * imageWidth + x] = 1;
    reconstruct.setBoundaryPointType(pointindex_1, static_cast<uint16_t>( 1));
                    }
                }
```

```
                if (y > 0 && y < imageHeight - 1 && x > 0) {
                    if (occupancyMap[(y - 1) * imageWidth + (x - 1)] == 0 ||
                            occupancyMap[(y + 1) * imageWidth + (x - 1)] == 0) {
                        PBflag[y * imageWidth + x] = 1;
                        reconstruct.setBoundaryPointType(pointindex_1,
static_cast<uint16_t>(1));
                    }
                }
                if (y > 0 && y < imageHeight - 1 && x < imageWidth - 1) {
                    if (occupancyMap[(y - 1) * imageWidth + (x + 1)] == 0 ||
                            occupancyMap[(y + 1) * imageWidth + (x + 1)] == 0) {
                        PBflag[y * imageWidth + x] = 1;
                        reconstruct.setBoundaryPointType(pointindex_1,
static_cast<uint16_t>(1));
                    }
                }
            }
        ...
    }
Syntax:                                                                              (3)
// 1st Extension boundary region
        if (occupancyMap[y * imageWidth + x] != 0) {
            if (y > 0 && y < imageHeight - 1) {
                if (PBflag[(y - 1) * imageWidth + x] == 1 ||
                        PBflag[(y + 1) * imageWidth + x] == 1) {
                    reconstruct.setBoundaryPointType(pointindex_1,
static_cast<uint16_t>(1));
                }
            }
            if (x > 0 && x < imageWidth - 1) {
                if (PBflag[y * imageWidth + (x + 1)] == 1 ||
                        PBflag[y * imageWidth + (x - 1)] == 1) {
                    reconstruct.setBoundaryPointType(pointindex_1,
static_cast<uint16_t>(1));
                }
            }
            if (y > 0 && y < imageHeight - 1 && x > 0) {
                if (PBflag[(y - 1) * imageWidth + (x - 1)] == 1 ||
                        PBflag[(y + 1) * imageWidth + (x - 1)] == 1) {
                    reconstruct.setBoundaryPointType(pointindex_1,
static_cast<uint16_t>(1));
                }
            }
            if (y > 0 && y < imageHeight - 1 && x < imageWidth - 1) {
                if (PBflag[(y - 1) * imageWidth + (x + 1)] == 1 ||
                        PBflag[(y + 1) * imageWidth + (x + 1)] == 1) {
                    reconstruct.setBoundaryPointType(pointindex_1,
static_cast<uint16_t>(1));
                }
            }
        }
```

Syntax (2) illustrates example syntax that the boundary detection engine 566 can use to identify points along patch boundaries using the occupancy map. Syntax (3) illustrates example syntax that the boundary detection engine 566 can use to identifying points in the immediate neighborhood of the points at patch boundaries (as identified via Syntax (2)). The boundary detection engine 566 can perform multiple passes over a frame to identify both boundary points and neighboring points. For example, during a first pass, as indicated in Syntax (2), a flag notated as "PBflag" is set to one for each point at patch boundaries that is identified. A query point is identified as a boundary point when it is identified as a valid point, based on the occupancy map, but one of the points adjacent to the query point is identified as an invalid point based on the occupancy map. Then during a second pass, as indicated in Syntax (3), any neighboring point of a boundary point with the "PBflag" set to one, is identified as a boundary point as well. For example, during the second pass, any valid point that is adjacent to the query point, which is not itself a boundary point is identified as a neighboring point. The boundary detection engine 566 can classify both boundary points and neighboring boundary points as boundary points that color smoothing is applied thereto. In certain embodiments, the bitstream can include a number of pixels that are to be identified as neighboring pixels. For example, as number of pixels that are identified as boundary points increase, the larger the area of color smoothing is performed. The larger area that color smoothing is applied to decreases the likelihood that a visible artifact will remain after color smoothing.

In another embodiment, the boundary detection engine 566 identifies only boundary points of a patch. That is, the neighboring points of a point at a patch boundary are not identified. For example, the boundary detection engine 566 inspects each point (a query point) of a 2D frame with respect to the occupancy map. If the occupancy map indicates that the query point is not zero in the occupancy map, then the boundary detection engine 566 determines whether a neighboring point to the query point is zero in the occupancy map. If the neighboring point is zero, then the query point is classified as a boundary point. The boundary detection engine 566 performs this process for each point, until each boundary point is identified and classified as a boundary point.

In yet another embodiment, the boundary detection engine 566 performs a K-d tree nearest neighbor search with respect to a query point of a 2D frame. For a query point, the boundary detection engine 566 derives the distance between each neighboring point and the query point. The boundary detection engine 566 then determines whether the derived distance between each neighboring point and the query point is smaller than a first threshold. The first threshold can be a predefined radius of smoothing. If the distance between the query point and a neighboring point is larger than the first threshold, then the boundary detection engine 566 discards the neighboring point. If the distance between the query point and a neighboring point is smaller than the first threshold, then the boundary detection engine 566 determines whether the distance of a neighboring point from the query point is smaller than a second threshold as well as determining whether the neighboring point is located in another patch within the 2D frame. The second is based on the radius of boundary detection. If the distance between the query point and a neighboring point is smaller than the second threshold and the neighboring point is located in another patch, then the query point is identified as a boundary point.

The smoothing engine 568 performs color smoothing with respect to the pixels that are identified as boundary points as well as neighboring boundary points.

(4)
```
Syntax:
void PCCCodec::smoothPointCloudColor( ... ){
        const size_t pointCount = reconstruct.getPointCount( );
        PCCStaticKdTree3 kdtree;
        kdtree.build(reconstruct);
        PCCPointSet3 temp;
        temp.resize(pointCount);
        tbb::task_arena limited((int)params.nbThread);
        limited.execute([&] {
                tbb::parallel_for(size_t(0), pointCount, [&](const size_t i) {
                        // for (size_t i = 0; i < pointCount; ++i) {
                        const size_t maxNeighborCount = 512;
                        PCCPointDistInfo nNeighbor[maxNeighborCount];
                        PCCNNResult result = {nNeighbor, 0};
                        const double maxDist = ceil(sqrt(params_.radius2ColorSmoothing));
                        PCCNNQuery3 query = {PCCVector3D(0.0), maxDist,
                                        (std::min)(maxNeighborCount,
params_.neighborCountColorSmoothing)};
                        if (reconstruct.getBoundaryPointType(i) == 2) {
                                query.point = reconstruct[i];
                                kdtree.findNearestNeighbors(query, result);
                                assert(result.resultCount);
                                PCCVector3D centroid(0.0);
                                size_t neighborCount = 0;
                                std::vector<uint8_t> Lum;
                                for (size_t r = 0; r < result.resultCount; ++r) {
                                        const double dist2 = result.neighbors[r].dist2;
                                        if (dist2 > params_.radius2ColorSmoothing) {
                                                break;
                                        }
                                        ++neighborCount;
                                        const size_t index = result.neighbors[r].index;
                                        PCCColor3B color = reconstruct.getColor(index);
                                        centroid[0] += double(color[0]);
                                        centroid[1] += double(color[1]);
                                        centroid[2] += double(color[2]);
                                        double Y =
                                                0.2126 * double(color[0]) + 0.7152 * double(color[1]) + 0.0722 *
double(color[2]);
                                        Lum.push_back(uint8_t(Y));
                                }
                                PCCColor3B color;
                                if (neighborCount) {
                                        for (size_t k = 0; k < 3; ++k) {
                                                centroid[k] = double(int64_t(centroid[k] + (neighborCount / 2)) /
neighborCount);
                                        }
                                        // Texture characterization
                                        double H = Entropy(Lum, int(neighborCount));
                                        PCCColor3B colorQP = reconstruct.getColor(i);
                                        double distToCentroid2 = 0;
                                        for (size_t k = 0; k < 3; ++k) {
                                                distToCentroid2 += abs(centroid[k] − double(colorQP[k]));
                                        }
```

-continued

```
        if(distToCentroid2>= double(params_.thresholdColorSmoothing) &&
               H < double(params_.thresholdLocalEntropy)) {
                color[0] = uint8_t(centroid[0]);
                color[1] = uint8_t(centroid[1]);
                color[2] = uint8_t(centroid[2]);
                reconstruct.setColor(i, color);
            }
          }
        }
      });
   });
}
```

Syntax (4) illustrates how the decoder 550 performs color smoothing at the identified patch boundaries. FIG. 6 below, illustrates an example method of performing smoothing. After the boundary detection engine 566 identifies and classifies both the valid points at the patch boundary and the valid neighboring points of the patch boundary as boundary points, the smoothing engine 568 derives the local entropy for the boundary points. For Example, the texture characterization of Syntax (4) indicates that the entropy, H, is based on the luminance values of the boundary points. Thereafter the smoothing engine 568 compares the local entropy against a threshold, such as the threshold indicated by "params_.thresholdLocalEntropy." If the local entropy is less than the threshold then the smoothing engine 568 calculates a centroid of the color of boundary points. The centroid represents the average value of each color component of the boundary points. For example, the centroid includes an average of the red color values, an average of the blue color values, and an average of the green color values of the boundary points. If the difference between the color values of a point along the boundary of the patch and the color values of the centroid is larger than the "params_.thresholdColorSmoothing" threshold, then the smoothing engine 568 replaces the color values of the boundary point with the color values of the centroid.

In certain embodiments, the smoothing engine 568 performs color smoothing as described in FIG. 7, below, which is similar Syntax (4) above. In other embodiments, the smoothing engine 568 derives the median of color of the neighborhood of points around the query point. The smoothing engine 568 then replaces the color components of the query point with the median value of the color components of the neighborhood of points. It should be noted that the smoothing engine 568 can use an averaging filter, a bilateral filter, a second-order statistical filter, and the like, instead of the median filter for color smoothing the color components of the neighborhood of points.

In yet other embodiments, the smoothing engine 568 identifies a large neighborhood of points around a query point as well as a small neighborhood of points around the same query point. The smoothing engine 568 derives the median value of the luminance value of the large neighborhood of points. The smoothing engine 568 also derives the value of the luminance value of each point included in the small neighborhood of points. The smoothing engine 568 then compares the luminance value of each point included in the small neighborhood against the median value of the luminance value of the large neighborhood of points. If the difference between a luminance value of a point in the small neighborhood and the median luminance value of the large neighborhood is larger than a threshold, then that point is excluded from color smoothing. After excluding the one or more points of the small neighborhood that are larger than the threshold, the smoothing engine 568 derives the average value of each color component for the remaining points in the small neighborhood. Thereafter, the smoothing engine 568 replaces the color components of the query point with the derived color components of the remaining points in the small neighborhood. It should be noted that the smoothing engine 568 can use an averaging filter, a bilateral filter, a second-order statistical filter, and the like, instead of the median filter for color smoothing the color components of the large neighborhood of points.

In another embodiment, the smoothing engine 568 can take into account local characteristics of the point cloud near patch boundaries. That is, when the point cloud is highly textured the smoothing engine 568 performs less smoothing, whereas when the point cloud is less textured, the smoothing engine 568 performs more smoothing. For example, the smoothing engine 568 identifies a large neighborhood of points around a query point. The smoothing engine 568 then derives the average value of each color and standard deviation values for each color component in the neighborhood of points. The ratio of the standard deviation to the average value of each color is compared to a first threshold. If the ratio of the standard deviation to the average value of any color is larger than the first threshold, then the smoothing engine 568 performs no color smoothing with respect to the large neighborhood. Alternately, if the ratio of the standard deviation to the average value of any color is smaller than the first threshold, then the smoothing engine 568 determines whether the ratio of value of each color component of the query point to the standard deviation of the same color component in the large neighborhood is less than a second threshold. If the ratio of the value of each color component of the query point to the standard deviation of the same color component is less than the second threshold, then the smoothing engine 568 performs no color smoothing with respect to the large neighborhood. No color smoothing is performed since the query point is similar to its neighborhood. If the query point is not similar to its neighborhood (such as when the ratio of the value of each color component of the query point to the standard deviation of the same color component is larger than the second threshold) then the smoothing engine 568 identifies a small neighborhood of points around the query point. Thereafter the smoothing engine 568 derives the average value for each color component of the points in the small neighborhood of points. After deriving the average value for each color component of the points in the small neighborhood of points, the smoothing engine 568 replaces the color values of the query point with the derived average values for each color component of the points in the small neighborhood of points.

In another embodiment, the texture is characterized based on the average of the absolute difference of the luminance of the points in the neighborhood. For example, if the local texture is smooth, then the smoothing engine 568 will approximate the local entropy to be small. The smoothing engine 568 identifies a neighborhood of points around a query point. The smoothing engine 568 then derives the average absolute difference of the point luminance in the neighborhood. Alternatively, the smoothing engine 568 then derives the average color components of the point luminance in the neighborhood. The smoothing engine 568 then compares the average Absolute difference against a threshold. If the average absolute difference is larger than the threshold then the smoothing engine 568 does not perform color smoothing. Alternatively, if the average absolute difference is less than the threshold then the smoothing engine 568 derives the average value for each color component for the points in the neighborhood. Thereafter, the smoothing engine 568 replaces the color values of the query point with the derived average value for each color component for the points in the neighborhood.

FIG. 5B illustrates the encoder 510 includes a received 3D point cloud 512, a patch generator 514, the flag generator 516, a frame packing 520, various frames (such as one or more geometry frames 522, one or more texture frames 524, and one or more occupancy map frames 526), an encoding engine 528, and a multiplexer 530. The 3D point cloud 512 represents the input into the encoder 510 and can be similar to the point cloud 405, the mesh 410, and the 3D point cloud 420. The 3D point cloud 512 can be stored in memory (not shown) or received from another electronic device (not shown). The 3D point cloud 512 can be a single 3D object, scenery, video content, and the like. The encoder 510 generates a compressed bitstream 532 which can be transmitted to the network 502 of FIG. 5A.

The patch generator 514 decomposes the 3D point cloud 512 and creates multiple patches, such as the patches 432 of 442 of FIGS. 4C and 4D. The patches can be organized by an attribute, such as geometry, texture, reflectiveness, material, and the like. Geometry (such as the geometry frames 522 and the frame 440 of FIG. 4D) is the geographic location of each point of the 3D point cloud 512. Texture (such as the texture frames 524 and the frame 430 of FIG. 4C) represents a single aspect of each point of the 3D point cloud 512, such as color. In certain embodiments, additional frames can be created that represent the other attributes.

As discussed above in FIG. 5A, the flag generator 516 generates the flag 518 which indicates whether the decoder 550 is to perform color smoothing. In certain embodiments, the flag generator 516 can also generate the parameters that are embedded in the bitstream.

The frame packing 520 sorts and packs the patches into the geometry frames 522 and the texture frames 524. In certain embodiments, frame packing 520 generates one or more occupancy maps based on the placement of the patches within the geometry frames 522 and the texture frames 524. For example, the frame packing 520 groups similar attributes to the same frame. For example the geometry frames 522 includes patches of points that represent the geometry of the 3D point cloud 512, whereas the texture frames 524 include patches of points that represent the texture of the 3D point cloud 512.

The occupancy map frames 526 represent occupancy maps that indicate the valid pixel location in the frames (such as the geometry frames 522 and the texture frames 524). The valid pixels are the actual points of the 3D point cloud 512 which are projected into patches (via the patch generator 514) and packed into respective frames (via the frame packing 520). For example, the occupancy map frames 526 indicate whether each point in a frame is a valid pixel or an invalid pixel. A valid point on the occupancy map indicates a pixel on the 2D frame that corresponds to a 3D point in the point cloud. If the occupancy map indicates that a point is an invalid pixel, then that the pixel does not correspond to a point of the 3D point cloud 512. The invalid points are locations of the frame that does not correspond to a point of the point cloud. In certain embodiments, one of the occupancy map frames 526 can correspond to the both a geometry frame 522 and a texture frames 524.

The geometry frames 522, the texture frames 524, and the occupancy map frames 526 are encoded via the encoding engine 528. In certain embodiments, the flag 518 is encoded by the encoding engine 528. In certain embodiments, multiple encoding engines can encode the sets of frames separately. For example, one encoding engine can encode the geometry frames 522, another encoding engine can encode the texture frames 524, and yet another encoding engine can encode the occupancy map frames 526. In certain embodiments, the encoding engine 528 can be configured to support an 8-bit, a 10-bit, a 12-bit, a 14-bit, or a 16-bit, precision of data. The encoding engine 528 can be a video or image codec such as HEVC, AVC, VP9, VP8, JVNET, and the like to compress the 2D frames representing the 3D point cloud.

The multiplexer 530 combines the encoded frames and the flag 518 to create a single encoded bitstream 532. The multiplexer 530 is also able to combine the parameters that instruct the decoder 550 as to how to perform color smoothing.

FIG. 5C illustrates the decoder 550 that includes a demultiplexer 552, a decoding engine 560, the flag 518, and a reconstruction engine 564. The decoder 550 receives the compressed bitstream 532 that originated from the encoder 510. The demultiplexer 552 separates various streams of data from the encoded bitstream 532. For example, the demultiplexer 552 separates various streams of data such as the geometry frame information 554 (originally the geometry frames 522 of FIG. 5B), texture frame information 556 (originally the texture frames 524 of FIG. 5B), the occupancy map information 558 (originally the occupancy map frames 526 of FIG. 5B), and the flag 518.

The bitstream of the geometry frame information 554, the bitstream of the texture frame information 556, and the bitstream of the occupancy map information 558 are decoded, via the decoding engine 560, to generate the 2D video frames representing the geometry and texture of the 3Dpoint cloud as well as the and occupancy map frames. In certain embodiments, separate, parallel decoding engines similar to the decoding engine 560, can process each received bitstream.

The reconstruction engine 564 includes the boundary detection engine 566 and the smoothing engine 568, described above in FIG. 5A. The reconstruction engine 564 reconstructs the 3D point cloud based on the flag 518, the decoded geometry frames, the decoded texture frames, and the occupancy map frames. The reconstruction engine 564 can identify whether the flag 518 indicates color smoothing is to be performed. For example, the flag 518 indicates whether the boundary detection engine 566 is to identify boundary points (both points along a patch boundary and the corresponding neighboring points) and whether the smoothing engine 568 is to perform smoothing of the identified boundary points. After boundary detection engine 566 identifies boundary points, and the smoothing engine 568 smoothes the neighborhood of points near the boundary points, the reconstruction engine 564 reconstructs the 3D point cloud 512.

Although FIG. 5A illustrate the environment-architecture 500, FIG. 5B illustrates the encoder 510, and FIG. 5C illustrates the decoder 550 various changes can be made to FIGS. 5A, 5B, and 5C. For example, any number of encoders or determines can be included environment-architecture 500.

FIG. 6 illustrates an example portion of a 2D frame 600 in accordance with an embodiment of this disclosure. The portion of the 2D frame 600 includes pixels 601-630. The pixels are for illustration only. Other embodiments can be used without departing from the scope of this disclosure. As shown here, the pixels 601-630 can be included in a frame, such as the frame 430 of FIG. 4C, the frame 440 of FIG. 4D, any of the geometry frames 522 of FIG. 5B or any of the texture frames 524 of FIG. 5B.

The pixels 601-630 represent pixels in a frame that include both valid points and invalid points as indicated by an occupancy map, such as one of the occupancy map frames 526 of FIG. 5B. The pixels 601-630 each include a value, such as a one or a zero as indicated by the occupancy map. As shown in FIG. 6, a value of zero indicates an invalid pixel, while a value of one is associated with a valid pixel. For example, pixels 612, 613, 614, 617, 618, 619, 620, 622, 623, 624, 625, 628, 629, and 630 represent a portion of a patch, while pixels 601-611, 615, 616, 621, 626, and 627 are invalid pixels and represent a blank space on the frame.

The boundary detection engine 566 of FIGS. 5A and 5C performs boundary detection of patches in a frame. For example, the boundary detection engine 566 identifies a boundary between a valid pixel and an invalid pixel. The boundary detection engine 566 can perform multiple passes of the frame to identify boundaries between valid pixels and invalid pixels.

For example, the boundary detection engine 566 can inspect the pixel 601. The pixel 601 includes a zero value as indicated by the occupancy map, which indicates that the pixel 601 is an invalid point. Therefore, the boundary detection engine 566 continues to scan the frame.

In certain embodiments, the boundary detection engine 566 can scan the entire frame and flag each valid pixel. After identifying valid pixels, the boundary detection engine 566 can identify boundary pixels based on whether a valid pixel is adjacent to an invalid pixel. In other embodiments, the boundary detection engine 566 inspects each individual pixel at a time to determine whether the pixel is valid or invalid. Upon identifying a valid pixel, the boundary detection engine 566 can determine whether the pixel is a boundary pixel based on whether the valid pixel is adjacent to an invalid pixel.

The pixel 618 includes a value of one as indicated by the occupancy map, which indicates that the pixel 618 is a valid pixel. When the boundary detection engine 566 inspects pixel 618, and identifies that the pixel 618 is a valid pixel, the boundary detection engine 566 identifies whether any of the adjacent pixels are invalid. The adjacent pixels are the pixel 612, 613, 614, 617, 619, 622, 623, and 624. The eight adjacent pixels all include a value of one (as indicated by the occupancy map), which indicates that the eight adjacent pixels are valid pixels. Since none of the adjacent pixels to the pixel 618 are invalid, the boundary detection engine 566 can determine that the pixel 618 is not a boundary pixel.

The pixel 612 includes a value of one as indicated by the occupancy map, indicating that the pixel 612 is a valid pixel. When the boundary detection engine 566 inspects the pixel 612, and identifies that the pixel 612 is a valid pixel, the boundary detection engine 566 identifies whether any of the adjacent pixels are invalid. The eight adjacent pixels are the pixel 606, 607, 608, 611, 613, 616, 617, and 618. The eight adjacent pixels include both values of one and values of zero as indicated by the occupancy map. Since some of the pixels are valid pixels (the pixels with the value of one) and other pixels are invalid pixels (the pixels with the value of zero), the boundary detection engine 566 classifies the pixel 612 as a boundary pixel.

It should be noted, that each pixel can include up to eight adjacent pixels. As shown in FIG. 6 the pixels 612, 613, 614, 617, 619, 620, 622, 623, 624, and 629 are boundary pixels. After identifying the boundary pixels, the boundary detection engine 566 can identify neighboring valid pixels of a boundary pixel. For example, the adjacent valid pixels to the pixel 612 include the pixels 613, 617, and 618. In certain embodiments, the pixels 613, 617, and 618 can be identified as valid neighboring pixels. In other embodiments, since the pixels 613 and 617 are also boundary pixels, the pixels 613 and 617 can be excluded as neighboring pixels. Therefore, since the pixel 618 is a valid pixel and not a boundary pixel, the pixel 618 is a valid neighboring pixel of the pixel 612. Therefore, the boundary detection engine 566 can classify the pixel 618 as a boundary pixel in addition to the boundary pixel; of 612, 613, and 617. The pixel 612 can be referred to as a query point, as the pixel 612, was the inspected pixel to which the pixel that 618 was identified as a neighboring pixel.

In certain embodiments, the parameters embedded in the bitstream by the encoder 510 can indicate the number of neighboring pixels to a boundary point. For example, if two neighboring pixels are to be classified as boundary pixels, then the boundary detection engine 566 can identify valid neighboring pixels of the pixel 618. The valid adjacent pixels of the pixel 618 include the pixels 612, 613, 614, 617, 619, 622, 623, and 624. Since the pixels 612, 613, 614, 617, 619, 622, and 623 are already identified as boundary pixels the boundary detection engine 566 can classify the pixel 624 as a boundary pixel as well (as the pixel 624 is not a boundary pixel and is a neighboring pixel of the pixel 618, which is a neighboring pixel of the pixel 612). If the parameter indicates that additional neighboring pixels are to be classified as boundary pixels the boundary detection engine 566 can continue identifying subsequent neighboring pixels until the distance from the boundary point, as indicated in the parameter is satisfied.

Although FIG. 6 illustrates one example of pixels on a frame, various changes can be made to FIG. 6. For example, any number of pixels can be included in the portion of the frame 600, and any of the pixels can be valid or invalid points on the frame.

Figure 7:
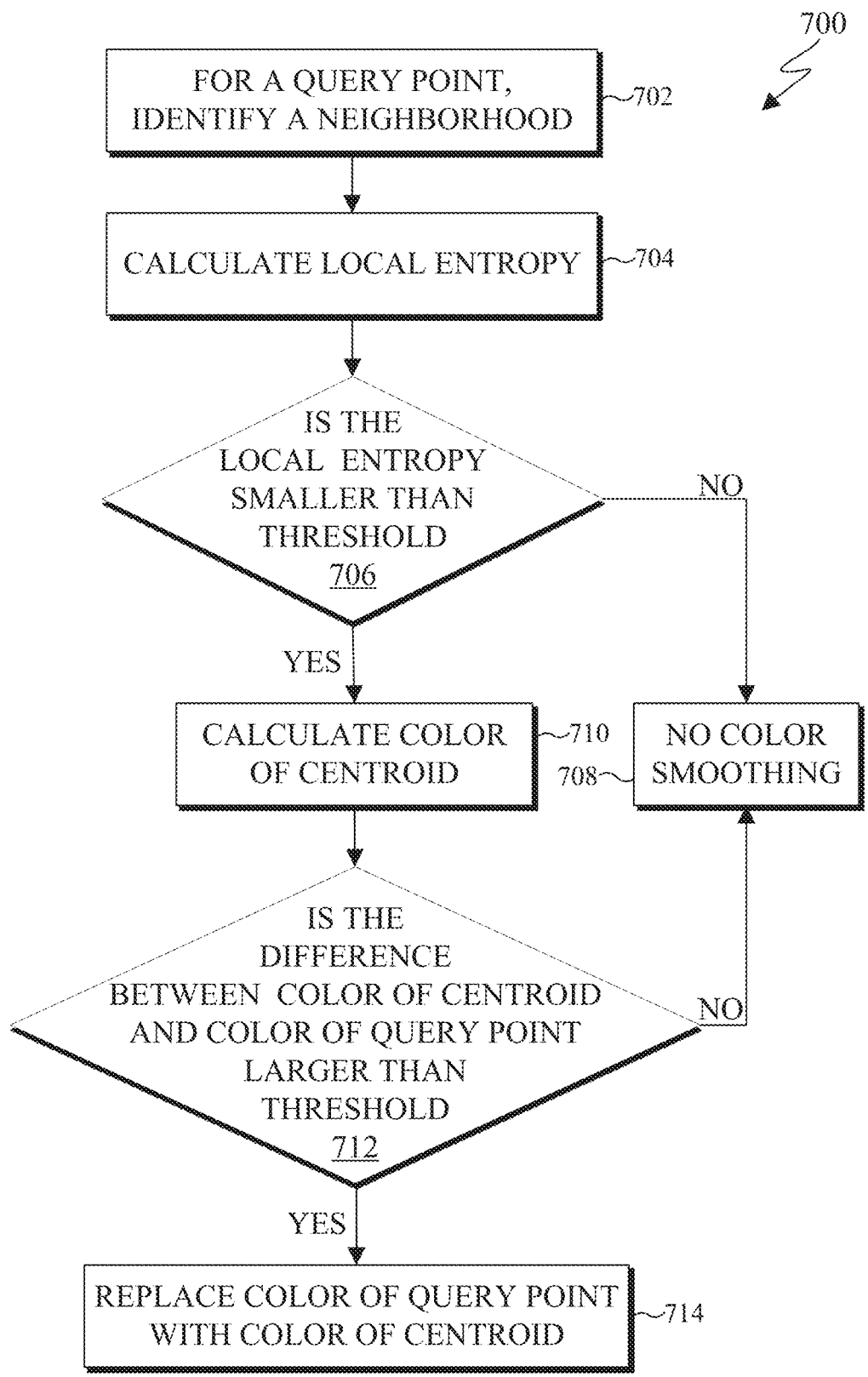
FIG. 7 illustrate example method for smoothing a patch boundary in accordance with an embodiment of this disclosure.

FIG. 7 illustrate example method 700 for smoothing a patch boundary in accordance with an embodiment of this disclosure The method 700 can be performed by the sever 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the method 700 is described as being performed by the decoder 550 of FIGS. 5A and 5C.

In step 702, boundary detection engine 566 identifies a neighborhood of pixels around a query point. The query point can be a boundary pixel such as the pixel 612 of FIG. 6, and the neighborhood of pixels includes both boundary points and neighboring points of the query pixel. For example, the neighborhood, of pixels, of one level deep, around the pixel 612 can include the pixel 618. In another example, the neighborhood, of pixels, of two levels deep, around the pixel 612 can include the pixels 618 and 624.

In step 704, the smoothing engine 568 calculates the local entropy for the neighborhood of pixels (referred to as the boundary points). In certain embodiments, entropy is based on the luminance of the pixels that were identified in step 702. In other embodiments, entropy is based on the color components of the valid pixels that were identified in step 702.

In step 706, the smoothing engine 568 determines whether the entropy of the boundary points is smaller than a threshold. The threshold is the parameter, "params_.thresholdLocalEntropy," as described above. If the entropy of the boundary points is larger than the threshold, then in step 708 the boundary points are not smoothed. If the no smoothing is to be performed, the decoder 550 can continue reconstructing the point cloud without smoothing the boundary points.

If the entropy of the boundary points is smaller than the threshold, then in step 710, the smoothing engine 568 calculates the centroid of the color points of the boundary points that were identified in step 702. As described above the centroid represents the average value of each color component of the boundary points. For example, the centroid includes an average of the red color values, an average of the blue color values, and an average of the green color values of the boundary points.

In step 712 the smoothing engine 568 determines whether the difference between color values of the centroid and the color value of the query point (such as the pixel 612 of FIG. 6) is larger than a second threshold. The second threshold is the parameter "params_.thresholdColorSmoothing," as described above. If the difference between color values of the centroid and the color value of the query point is smaller than the second threshold then in step 708 the boundary points are not smoothed. If the no smoothing is to be performed, the decoder 550 can continue reconstructing the point cloud without smoothing the boundary points. If the difference between color values of the centroid and the color value of the query point is larger than a second threshold, then in step 714, the smoothing engine 568 replaces the color values of the boundary points with the color values of the centroid.

Although FIG. 7 illustrates one example of a method 700 for performing smoothing, various changes may be made to FIG. 7. For example, while shown as a series of steps, various steps in FIG. 7 could overlap, occur in parallel, or occur any number of times.

Figure 8:
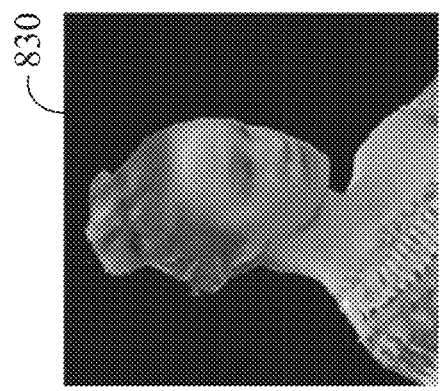
FIG. 8 illustrates an example point cloud with smoothing in accordance with an embodiment of this disclosure.
Figure 8:
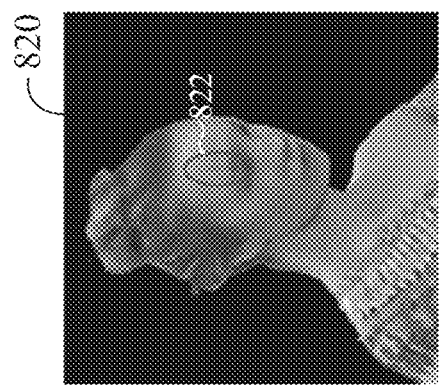
Figure 8:
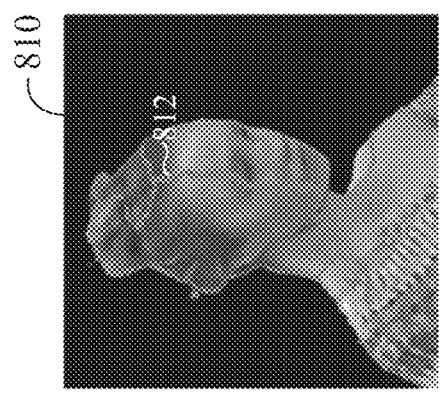

FIG. 8 illustrates an example point clouds with smoothing in accordance with an embodiment of this disclosure. FIG. 8 illustrates a point cloud at different stages during the reconstruction. The point cloud 810 depicts a point cloud with lines 812 indicating patch boundaries. The point cloud 820 indicates a visible artifact 822 on the point cloud. The point cloud 830 illustrates the point cloud after smoothing is performed with respect to the visible artifact 822. For example, the entropy of the boundary points near the visible artifact 822 is low, but there is significant color difference between the average of the colors of the boundary points and the actual color of the boundary point. Therefore, the color smoothing engine 568 performs color smoothing with respect to the area around the visible artifact 822. Although FIG. 8 illustrates one example of point cloud, various changes can be made to FIG. 8.

Figure 9:
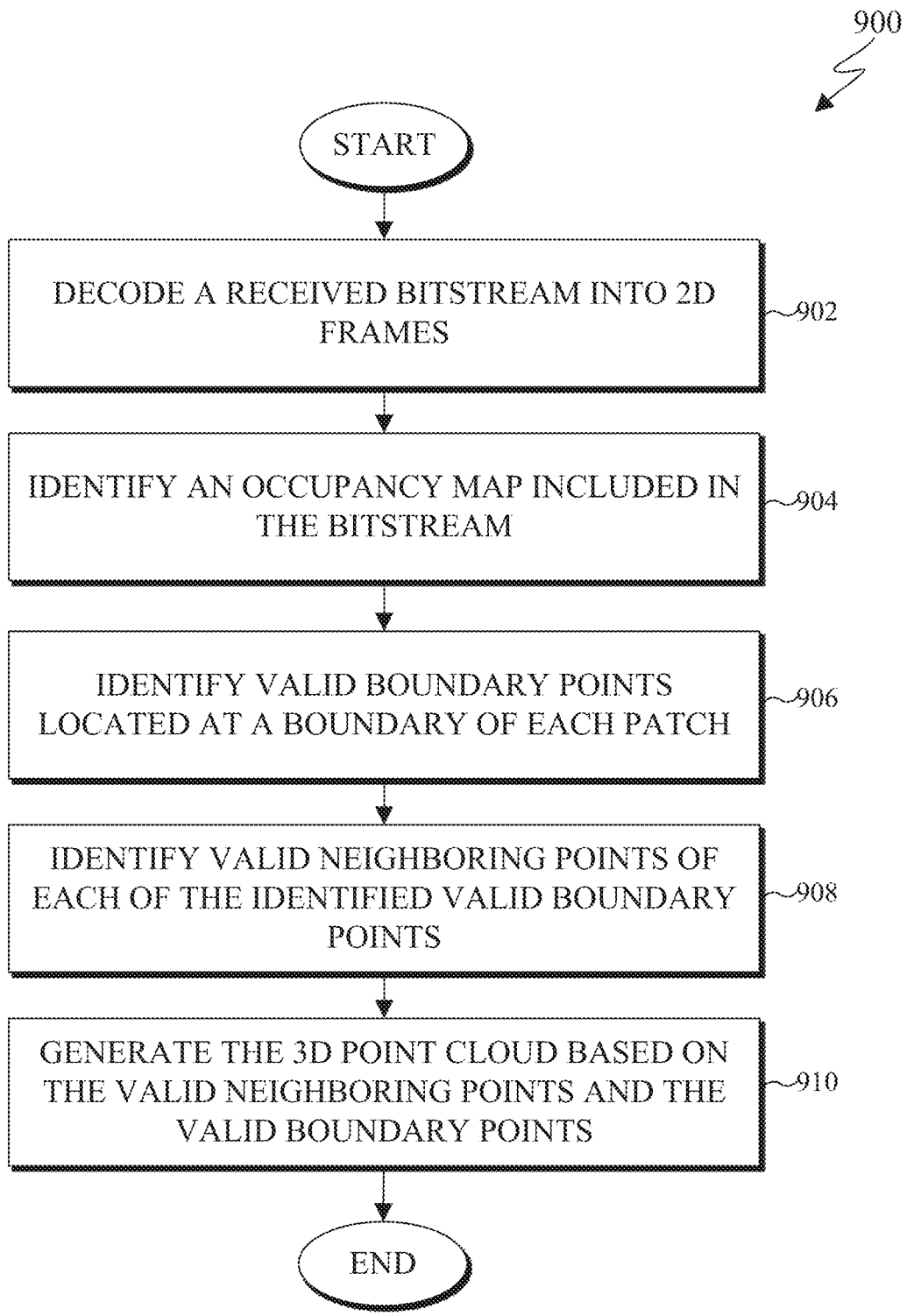
FIG. 9 illustrates example method for decoding a point cloud in accordance with an embodiment of this disclosure.

FIG. 9 illustrates example method 900 for decoding a point cloud in accordance with an embodiment of this disclosure. The method 900 can be performed by the sever 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the method 900 is described as being performed by the decoder 550 of FIGS. 5A and 5C.

The process begins with the decoder, such as decoder 550, receiving a compressed bitstream. The received bitstream can include an encoded point cloud that was mapped onto multiple 2D frames, compressed, and then transmitted and ultimately received by the decoder. In step 902, the decoder 550 decodes the bitstream. The decoder 550 decodes the compressed bitstream into multiple 2D frames corresponding to an attribute that is associated with the 3D point cloud. The 2D frames include a set of patches repressing a cluster of pixels of the 3D point cloud.

In step 904, the decoder 550 identifies an occupancy map included in the bitstream. The occupancy map indicates locations of points in the 2D frames that represent valid pixels of the 3D point cloud. In certain embodiments, the decoder 550 identifies a flag that indicates whether color smoothing is to per performed. Additionally, the decoder 550 can identify parameters, such as metadata that instructs the decoder how to perform the color smoothing.

In step 906, the decoder 550 identifies valid boundary points which are located at the boundary between valid points and invalid points as indicated by the occupancy map. For each point in a 2D frame, the decoder 550 determines whether the occupancy map indicates the point is a valid point or in invalid point. For example, if a point is identified a zero, the point is an invalid point. When the value assigned to a point is not zero (such as the value of one), the point is a valid point. After the decoder 550 identifies a first valid point, the decoder identifies whether one of the adjacent points, of the first valid point, is an invalid point. If one of the adjacent points is invalid, then the first valid point is classified as a valid boundary point.

In step 908, the decoder 550 identifies valid neighboring points of each of the valid boundary points. If another one of the adjacent points to the first valid point is a valid point, the decoder 550 identifies whether the other point is also a boundary point. If the other point is a valid point but not a boundary point, the decoder 550 classifies that point as a valid neighboring point.

In step 910, the decoder 550 generates, using the sets of 2D frames, the 3D point cloud based on the valid neighboring points and the valid boundary points. The decoder can use the identified boundary points and the neighboring points when reconstructing the 3D point cloud.

Although FIG. 9 illustrates one example of a method 900 for performing smoothing, various changes may be made to FIG. 9. For example, while shown as a series of steps, various steps in FIG. 9 could overlap, occur in parallel, or occur any number of times.

Figure 10:
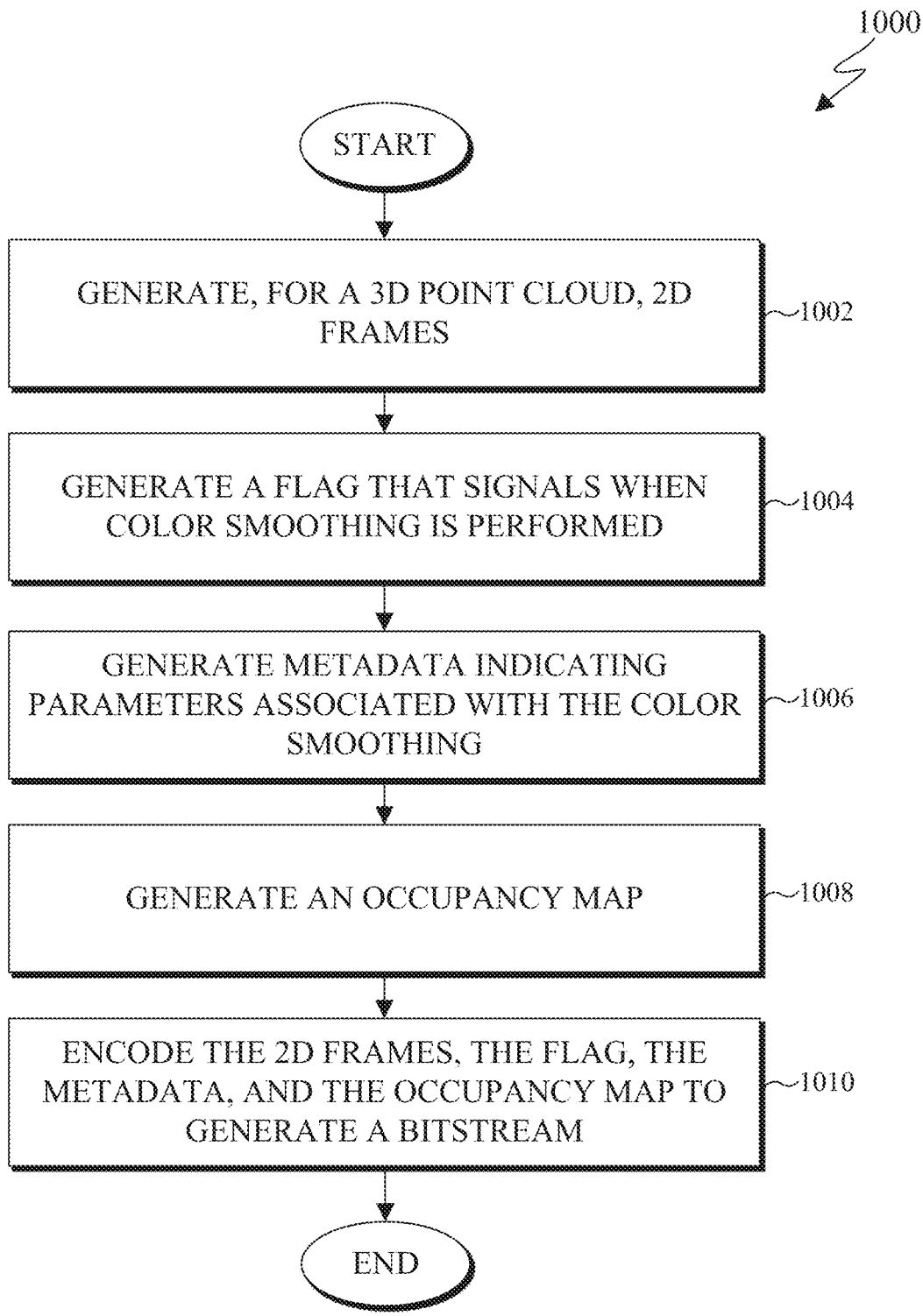
FIG. 10 illustrates example method for encoding a point cloud in accordance with an embodiment of this disclosure.

FIG. 10 illustrate example method for encoding a point cloud in accordance with an embodiment of this disclosure. The method 1000 can be performed by the sever 104 or any of the client devices 106-116 of FIG. 1, the server 200 of FIG. 2, the electronic device 300 of FIG. 3, the encoder 510 of FIGS. 5A and 5C, or any other suitable device or system. For ease of explanation, the method 1000 is described as being performed by the encoder 510 of FIGS. 5A and 5C.

In step 1002, the encoder 510 generates 2D frames that represent a 3D point cloud. The 2D frames correspond to an attribute that is associated with the 3D point cloud. The 2D frames include a set of patches repressing a cluster of pixels of the 3D point cloud.

In step 1004, the encoder 510 generates a flag that signals when color smoothing is performed. For example, the encoder 510 can identify whether boundaries of certain patches on the 2D frames have high entropy, such that the boundary of the patch is highly textured. If the encoder 510 identifies that the boundary of the patch is highly textured, the encoder can generate a flag that indicates to the decoder 550 that color smoothing is to be performed.

In step 1006, the encoder 510 the encoder can generate metadata. In certain embodiments, the metadata can be generated in response to the flag being generated. In other embodiments, the metadata can be generated the based on the encoder 510 determining that color smoothing might be necessary. The metadata indicates parameters associated with the color smoothing. For example, the metadata can include a threshold level indicating a local entropy level. In another example, the metadata can include another threshold level indicating a color value where smoothing is to be applied. The metadata can also include additional parameters and thresholds.

In step 1008, the encoder 510 generates an occupancy map. The occupancy map indicates locations of points in the 2D frames that represent valid pixels of the 3D point cloud.

In step 1010, the encoder 510 encodes the 2D frames, the flag, the metadata, and the occupancy map to generate a bitstream. The bitstream can be ultimately transmitted to a decoder, such as the decoder 550.

Although FIG. 10 illustrates one example of a method 1000 for performing smoothing, various changes may be made to FIG. 10. For example, while shown as a series of steps, various steps in FIG. 10 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoding device for point cloud decoding, the decoding device comprising:
   a communication interface configured to receive a compressed bitstream; and
   a processor operably coupled to the communication interface, wherein the processor is configured to:
   decode the compressed bitstream into two-dimensional (2D) frames that represent a three-dimensional (3D) point cloud, each of the 2D frames including a set of patches representing a cluster of pixels of the 3D point cloud, identify an occupancy map included in the compressed bitstream, the occupancy map indicating locations of points in the 2D frames that represent valid pixels of the 3D point cloud,
   identify valid boundary points located at a boundary of a patch of the set of patches based on the occupancy map,
   identify valid neighboring points of each of the valid boundary points of the patch, and
   generate the 3D point cloud using the 2D frames based on the valid neighboring points and the valid boundary points.

2. The decoding device of claim 1, wherein:
   the 2D frames include a color frame representing color of the 3D point cloud; and
   the processor is further configured to:
   identify a flag within the compressed bitstream, wherein the flag indicates whether color smoothing is performed when generating the 3D point cloud; and
   in response to identifying the flag, perform color smoothing on the valid neighboring points and the valid boundary points; and
   to generate the 3D point cloud, the processor is configured to modify portions of the color frame by color smoothing the valid neighboring points and the valid boundary points.

3. The decoding device of claim 2, wherein to perform color smoothing, the processor is configured to:
   derive a local entropy value for the valid neighboring points and the valid boundary points;
   compare the local entropy value to a first threshold;
   when the local entropy value is smaller than the first threshold, calculate a centroid representing color values of the valid neighboring points and the valid boundary points;
   compare color values of the centroid to color values of a first boundary point of the valid boundary points; and
   when a difference between the color values of the centroid and the color values of the first boundary point is larger than a second threshold, replace the color values of the first boundary point with the color values of the centroid.

4. The decoding device of claim 3, wherein to calculate the centroid, the processor is configured to:
   identify red color values, green color values, and blue color values for each point of the valid neighboring points and the valid boundary points; and
   average the red color values, the green color values, and the blue color values to generate the centroid.

5. The decoding device of claim 3, wherein to derive the local entropy value is based on:
   luminance of the valid neighboring points, or
   color components of the valid neighboring points.

6. The decoding device of claim 1, wherein to identify the valid boundary points, the processor is further configured to:
   for each point in one of the 2D frames, determine whether a value assigned to a first point is set to a first value at a corresponding location of the first point in the occupancy map;
   when the value assigned to the first point is set to the first value, identify that the first point is an invalid point;
   when the value assigned to the first point is not set to the first value, identify whether a value assigned to a second point that is adjacent to the first point is set to the first value in the occupancy map; and after identifying that the value assigned to the second point is set to the first value, classify the first point as one of the valid boundary points.

7. The decoding device of claim 6, wherein:
the second point is one of eight points that surround the first point, and
the first value is set to zero in the occupancy map.

8. The decoding device of claim 6, wherein to identify the valid neighboring points, the processor is further configured to:
after identifying that the value assigned to the second point is set to the first value, identify whether a third point that is adjacent to the first point is not set to the first value in the occupancy map;
when a value assigned to the third point is not set to the first value, identify whether the third point is one of the valid boundary points; and
after identifying that the third point is not one of the valid boundary points, classify the third point as one of the valid neighboring points.

9. The decoding device of claim 8, wherein the processor is further configured to:
identify a set of metadata within the compressed bitstream, the set of metadata indicating a distance from the first point for color smoothing; and
continue to identify subsequent neighboring points that until the distance away from the first point is identified.

10. An encoding device for point cloud encoding, the encoding device comprising:
a processor configured to:
generate, for a three-dimensional (3D) point cloud, two-dimensional (2D) frames, each of the 2D frames including a set of patches representing a cluster of pixels of the 3D point cloud,
generate a flag that signals when color smoothing is performed,
generate metadata indicating parameters associated with the color smoothing,
generate an occupancy map indicating locations of points in the 2D frames that represent valid pixels of the 3D point cloud, and
encode the 2D frames, the flag, the metadata, and the occupancy map to generate a compressed bitstream; and
a communication interface operably coupled to the processor, the communication interface configured to transmit the compressed bitstream.

11. The encoding device of claim 10, wherein:
the metadata includes a first threshold and a second threshold, the first threshold indicating a local entropy level, and the second threshold indicating a color value for smoothing.

12. The encoding device of claim 10, wherein:
the occupancy map includes multiple first values and multiple second values, each of the multiple first values corresponds to invalid points on the 2D frames, and each of the multiple second values corresponds to valid points on the 2D frames.

13. The encoding device of claim 10, wherein:
the metadata is a first set of metadata; and
the processor is further configured to:
generate a second set of metadata indicating a quantity of valid neighboring points from a valid boundary point for color smoothing, and
encode the second set of metadata into the compressed bitstream.

14. A method for point cloud decoding, the method comprising:
receiving a compressed bitstream;
decoding the compressed bitstream into two-dimensional (2D) frames that represent a three-dimensional (3D) point cloud, each of the 2D frames including a set of patches representing a cluster of pixels of the 3D point cloud;
identifying an occupancy map included in the compressed bitstream, the occupancy map indicating locations of points in the 2D frames that represent valid pixels of the 3D point cloud;
identifying valid boundary points located at a boundary of a patch of the set of patches based on the occupancy map;
identifying valid neighboring points of each of the valid boundary points of the patch;
and
generating the 3D point cloud using the 2D frames based on the valid neighboring points and the valid boundary points.

15. The method of claim 14, wherein:
the 2D frames include a color frame representing color of the 3D point cloud;
the method further comprises:
identifying a flag within the compressed bitstream, wherein the flag indicates whether color smoothing is performed when generating the 3D point cloud, and
in response to identifying the flag, performing color smoothing on the valid neighboring points and the valid boundary points; and
generating the 3D point cloud, comprises modifying portions of the color frame by color smoothing the valid neighboring points and the valid boundary points.

16. The method of claim 15, wherein performing color smoothing comprises:
deriving a local entropy value for the valid neighboring points and the valid boundary points;
comparing the local entropy value to a first threshold;
when the local entropy value is smaller than the first threshold, calculating a centroid representing color values of the valid neighboring points and the valid boundary points;
comparing color values of the centroid to color values of a first boundary point of the valid boundary points; and
when a difference between the color values of the centroid and the color values of the first boundary point is larger than a second threshold, replacing the color values of the first boundary point with the color values of the centroid.

17. The method of claim 16, wherein calculating the centroid comprises:
identifying red color values, green color values, and blue color values for each point of the valid neighboring points and the valid boundary points; and
averaging the red color values, the green color values, and the blue color values to generate the centroid.

18. The method of claim 16, wherein deriving the local entropy value is based on:
luminance of the valid neighboring points, or
color components of the valid neighboring points.

19. The method of claim 14, wherein identifying the valid boundary points comprises:

for each point in one of the 2D frames, determining whether a value assigned to a first point is set to a first value at a corresponding location of the first point in the occupancy map;

when the value assigned to the first point is set to the first value, identifying that the first point is an invalid point;

when the value assigned to the first point is not set to the first value, identifying whether a value assigned to a second point that is adjacent to the first point is set to the first value in the occupancy map; and after identifying that the value assigned to the second point is set to the first value, classifying the first point as one of the valid boundary points.

20. The method of claim 19, wherein to identify the valid neighboring points comprises:

after identifying that the value assigned to the second point is set to the first value, identifying whether a third point that is adjacent to the first point is not set to the first value in the occupancy map;

when a value assigned to the third point is not set to the first value, identifying whether the third point is one of the valid boundary points; and after identifying that the third point is not one of the valid boundary points, classifying the third point as one of the valid neighboring points.

* * * * *